US011128236B2

(12) United States Patent
Chen et al.

(10) Patent No.: US 11,128,236 B2
(45) Date of Patent: Sep. 21, 2021

(54) MULTI-WINDING SINGLE-STAGE MULTI-INPUT BOOST TYPE HIGH-FREQUENCY LINK'S INVERTER WITH SIMULTANEOUS/TIME-SHARING POWER SUPPLIES

(71) Applicant: Qingdao University, Qingdao (CN)

(72) Inventors: Daolian Chen, Qingdao (CN); Yanhui Qiu, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 48 days.

(21) Appl. No.: 16/622,280

(22) PCT Filed: Dec. 6, 2018

(86) PCT No.: PCT/CN2018/000411
§ 371 (c)(1),
(2) Date: Dec. 12, 2019

(87) PCT Pub. No.: WO2019/136577
PCT Pub. Date: Jul. 18, 2019

(65) Prior Publication Data
US 2020/0136524 A1 Apr. 30, 2020

(30) Foreign Application Priority Data
Jan. 9, 2018 (CN) .......................... 201810019752.0

(51) Int. Cl.
*H02J 3/38* (2006.01)
*H02M 5/293* (2006.01)
(Continued)

(52) U.S. Cl.
CPC ......... *H02M 7/53871* (2013.01); *H02J 3/381* (2013.01); *H02M 5/293* (2013.01);
(Continued)

(58) Field of Classification Search
USPC .................................................... 307/82, 104
See application file for complete search history.

(56) References Cited

U.S. PATENT DOCUMENTS 8,189,351 B2 * 5/2012 Chung .................... H02M 3/28
363/17

FOREIGN PATENT DOCUMENTS

| CN | 101534061 | * | 9/2009 |
| CN | 101534061 A | | 9/2009 |

(Continued)

OTHER PUBLICATIONS

Qiu Yanhui, et al., Multi-Winding Simultaneously-Supplying DC-DC Converter Mode Multi-Input Inverter, Transactions of China Electrotechnical Society, Mar. 31, 2017, pp. 182-190, vol. 32, No. 6.

*Primary Examiner* — Toan T Vu
*Assistant Examiner* — Xuan Ly
(74) *Attorney, Agent, or Firm* — Bayramoglu Law Offices LLC

(57) ABSTRACT

A multi-winding single-stage multi-input boost type high-frequency link's inverter with simultaneous/time-sharing power supplies, having the circuit structure formed by connecting a plurality of mutually isolated high-frequency inverter circuits having an input filter and an energy storage inductor, a common output cycloconverter and filter circuit by a multi-input single-output high-frequency transformer. Each input end of the multi-input single-output high-frequency transformer is connected in one-to-one correspondence to the output end of each high-frequency inverter circuit. The output end of the multi-input single-output high-frequency transformer is connected to the input end of the output cycloconverter and filter circuit. The inverter has the following characteristics: multiple input sources are connected to a common ground or a non-common ground.

(Continued)

A Plurality of Mutually Isolated High-frequency Inverter Circuits With An Input Filter And An Energy Storage Inductor Output Cycloconverter And Filter Circuit The multiple input sources supply power to load in a simultaneous/time-sharing manner. The output and input high-frequency isolation is performed. The output cycloconverter and filter circuit is shared.

2 Claims, 17 Drawing Sheets

(51) Int. Cl.
  *H02M 7/538* (2007.01)
  *H02M 7/5387* (2007.01)
  *H02M 1/00* (2006.01)
(52) U.S. Cl.
  CPC ..... *H02M 7/53803* (2013.01); *H02J 2300/26* (2020.01); *H02J 2300/28* (2020.01); *H02J 2300/30* (2020.01); *H02M 1/007* (2021.05); *H02M 1/0083* (2021.05)

(56) References Cited

FOREIGN PATENT DOCUMENTS

| | | |
|---|---|---|
| CN | 101267167 B | 7/2010 |
| CN | 107493027 A | 12/2017 |
| CN | 107994799 A | 5/2018 |

* cited by examiner

MULTI-WINDING SINGLE-STAGE MULTI-INPUT BOOST TYPE HIGH-FREQUENCY LINK'S INVERTER WITH SIMULTANEOUS/TIME-SHARING POWER SUPPLIES

CROSS REFERENCE TO THE RELATED APPLICATIONS

This application is the national phase entry of International Application No. PCT/CN2018/000411, filed on Dec. 6, 2018, which is based upon and claims priority to Chinese Patent Application No. 201810019752.0, filed on Jan. 9, 2018, the entire contents of which are incorporated herein by reference.

TECHNICAL FIELD

The present disclosure relates to a multi-winding single-stage multi-input boost type high-frequency link's inverter with simultaneous/time-sharing power supplies and belongs to the field of power electronic transformation technology.

BACKGROUND

An inverter is a static converter device for converting an unstable and inferior direct current power into a stable and high-quality alternating current by using power semiconductor device which is supplied for the alternating current load or realizes the alternating current grid connection. A low-frequency electrical isolation inverter or a high-frequency electrical isolation inverter, which is respectively referred to as a low-frequency link's inverter or a high-frequency link's inverter, is provided between the output alternating current load or the alternating current grid and input direct current power supply. The electrical isolation element plays the following roles in the inverter. Realizing the electrical isolation between the output and input of the inverter and improving the safety, reliability and electromagnetic compatibility of the inverter operation. Matching the output voltage and the input voltage of the inverter, which achieves the technical effect that the output voltage of the inverter is higher than, equal to or lower than the input voltage, which greatly broadens the application range of the inverter. Greatly diminishing the volume and weight of the transformer and eliminating the audio noise when the operating frequency of the high-frequency transformer or the high-frequency energy storage transformer is above 20 kHz. Therefore, in the case of secondary electric energy conversion of the main direct current power sources such as direct current generators, accumulators, photovoltaic cells, fuel cells and so on, the inverter is important and has great value in many applications.

New energy sources (also known as green energy sources) such as solar energy, wind energy, tidal energy, and geothermal energy have the advantages of being clean, pollution-free, cheap, reliable, and sufficient. Thus, the application prospects thereof are vast. Since the traditional fossil energy sources (non-renewable energy sources) such as petroleum, coal and natural gas have become gradually insufficient and cause severe environmental pollution and global warming, and also since the nuclear energy production causes nuclear waste and environmental pollution, people have increasingly become focused on the development and utilization of new energy. New energy power generation mainly including photovoltaics, wind power, fuel cells, hydraulic power, and geothermal heat. However, all of them have defects. For instance, their power supply is unstable and unsustainable, and varies with climate conditions. Therefore, it is imperative to employ a distributed power supply system collectively supplied by various new energy sources.

The traditional new energy distributed power supply system as shown in FIG. 1 and FIG. 2 usually uses a plurality of single-input direct current converters to respectively perform an electric energy conversion on the new energy power generation devices without energy storage, such as photovoltaic cells, fuel cells, and wind power generators, through a unidirectional direct current converter. Moreover, the output ends are connected in parallel or in series and then connected to the direct current bus of the common inverter, for ensuring the cooperative power supply and the coordinative work of various new energy sources. The distributed power generating system enables a plurality of input sources to simultaneously supply power to the load and the preferential utilization of energy, thereby improving the stability and flexibility of the system. Nevertheless, there are defects such as two-stage power conversion, low power density, low conversion efficiency, and high cost, which restrict their practicality to a great extent.

In order to simplify the circuit structure and reduce the power conversion stage, a novel multi-input inverter with a single-stage circuit structure as shown in FIG. 3 is used to replace the traditional multi-input inverter including the direct current converter and the inverter connected in two-stage cascade, as shown in FIG. 1 and FIG. 2 to form a novel single-stage new energy distributed power supply system. The single-stage multi-input inverter allows inputting a variety of new energy, and the input energy sources may have the same or greatly different properties, amplitudes and characteristics. The novel single-stage new energy distributed power supply system has the following advantages. The circuit structure is simple. The single-stage power conversion is performed. A plurality of input sources supply the power to the load in a simultaneous or time-sharing manner in a high-frequency switching cycle and the cost is low.

Therefore, it is extremely urgent to actively seek a single-stage multi-input inverter that allows various new energy sources to collectively supply power and the new energy distributed power supply system thereof, which is of great significance in improving the stability and flexibility of the system and realizing the prioritized utilization or full utilization of new energy sources.

SUMMARY

The objective of the present disclosure is to provide a multi-winding single-stage multi-input boost type high-frequency link's inverter with simultaneous/time-sharing power supplies, having the following characteristics. Various new energy sources collectively supply power. The input direct current sources are connected to a common ground or a non-common ground. The transformer is provided with multiple primary side windings and one secondary side winding. The isolation is performed between high-frequency inverter circuits. The high-frequency isolation is performed between the output and the input. Multiple input sources supply power in a switching cycle in a simultaneous/time-sharing manner. The circuit topology is simple. The output cycloconverter and filter circuit is shared. The single-stage power conversion is performed. The voltage matching capacity is good. The power density is high. The conversion efficiency is high. The input current ripple is small. The output capacity is small and medium and the application prospect is broad.

The technical solution of the present disclosure is as follows. A multi-winding single-stage multi-input boost type high-frequency link's inverter with simultaneous/time-sharing power supplies is formed by connecting a plurality of mutually isolated high-frequency inverter circuits having an input filter and an energy storage inductor, a common output cycloconverter and filter circuit by a multi-input single-output high-frequency transformer. Each input end of the multi-input single-output high-frequency transformer is respectively connected to the output end of each high-frequency inverter circuit. The output end of the multi-input single-output high-frequency transformer is connected to the input end of the cycloconverter of the output cycloconverter and filter circuit. Each high-frequency inverter circuit with the input filter and the energy storage inductor is composed of the input filter, the energy storage inductor and a single-input single-output high-frequency inverter circuit and a single-input single-output which are successively connected in cascade. The output cycloconverter and filter circuit is composed of a full-wave or bridge cycloconverter and an output filter, which are successively connected in cascade. Each single-input single-output high-frequency inverter circuit is composed of a two-quadrant high-frequency power switch capable of withstanding the bidirectional voltage stress and the unidirectional current stress, or is composed of a four-quadrant high-frequency power switch capable of withstanding the bidirectional voltage stress and the bidirectional current stress. The full-wave or bridge cycloconverter is composed of multiple four-quadrant high-frequency power switches capable of withstanding the bidirectional voltage stress and the bidirectional current stress. The plurality of mutually isolated high-frequency inverter circuits invert pulsating direct currents with a amplitude thereof of a sine half-wave envelope in a plurality of high-frequency energy storage inductors $L_1, L_2, \ldots, L_n$ into bipolar three-state high-frequency pulse currents, and after electrical isolation, transmission and current matching of the high-frequency transformer, the bipolar three-state multi-level high-frequency pulse currents pass through a cycloconverter, a output C filter capacitor and a output C-L filter capacitor to obtain a high-quality sinusoidal alternating voltage or sinusoidal alternating current on a single-phase alternating current passive load or a single-phase alternating current grid, wherein n is a number of a plurality of input sources and is a natural number greater than 1; circuit topologies of the multi-winding single-stage multi-input boost type high-frequency link's inverter with simultaneous/time-sharing power supplies comprise a push-pull full-wave unidirectional circuit, a push-pull full-bridge unidirectional circuit, a push-pull forward full-wave unidirectional circuit, a push-pull forward full-bridge unidirectional circuit, a half-bridge full-wave unidirectional circuit, a half-bridge full-bridge unidirectional circuit, a full-bridge full-wave unidirectional circuit, a full-bridge full-bridge unidirectional circuit, a push-pull full-wave bidirectional circuit, a push-pull full-bridge bidirectional circuit, a push-pull forward full-wave bidirectional circuit, a push-pull forward full-bridge bidirectional circuit, a half-bridge full-wave bidirectional circuit, a half-bridge full-bridge bidirectional circuit, a full-bridge full-wave bidirectional circuit and a full-bridge full-bridge bidirectional circuit; the push-pull full-wave unidirectional circuit, the push-pull full-bridge unidirectional circuit, the push-pull forward full-wave unidirectional circuit, the push-pull forward full-bridge unidirectional circuit, the half-bridge full-wave unidirectional circuit and the half-bridge full-bridge unidirectional circuit are formed by 2n two-quadrant high-frequency power switches capable of withstanding the bidirectional voltage stress and the unidirectional current stress, and 2 or 4 four-quadrant high-frequency power switches, respectively; the full-bridge full-wave unidirectional circuit and the full-bridge full-bridge unidirectional circuit are formed by 4n two-quadrant high-frequency power switches capable of withstanding the bidirectional voltage stress and the unidirectional current stress, and 2 or 4 four-quadrant high-frequency power switches, respectively; the push-pull full-wave bidirectional circuit, the push-pull full-bridge bidirectional circuit, the push-pull forward full-wave bidirectional circuit, the push-pull forward full-bridge bidirectional circuit, the half-bridge full-wave bidirectional circuit and the half-bridge full-bridge bidirectional circuit are formed by 2(n+1) or 2(n+2) four-quadrant high-frequency power switches capable of withstanding the bidirectional voltage stress and the bidirectional current stress, respectively; the full-bridge full-wave bidirectional circuit and the full-bridge full-bridge bidirectional circuit are formed by $4(n+\frac{1}{2})$ or $4(n+1)$ four-quadrant high-frequency power switches capable of withstanding bidirectional voltage stress and bidirectional current stress, respectively; the circuit topologies of the multi-winding single-stage multi-input boost type high-frequency link's inverter with simultaneous/time-sharing power supplies all include n two-quadrant high-frequency clamp switches capable of withstanding the unidirectional voltage stress and the bidirectional current stress; a push-pull inverter, a push-pull forward inverter and a half-bridge inverter working in a power supply mode of a same duty ratio employ a instantaneous value feedback single-cycle phase-shift control strategy of n output voltages in the same duty ratio; a full-bridge inverter working in the power supply mode of the same duty ratio or in a power supply mode of different duty ratios employs a energy management control strategy of output voltage and input current instantaneous value feedback phase-shift master-slave power distribution, wherein first, second, $\ldots$, $(n-1)^{th}$ output power is fixed and the $n^{th}$ out power is used to make up shortfall of a power needed by a load; the multi-winding single-stage multi-input boost type high-frequency link's inverter with simultaneous/time-sharing power supplies invert a plurality of unstable input direct voltages connected to a non-common ground into a stable high-quality output AC power required by the load; the plurality of input sources supply power to an output AC load in a high-frequency switching cycle, and the plurality of input sources supply power to the output AC load in a simultaneous/time-sharing manner in a high-frequency switching cycle.

In the present disclosure, the traditional circuit structure of the multi-input inverter composed of the direct current converter and the inverter, which are connected in two-stage cascade, of the multiple new energy combined power supply system, is constructed into a novel circuit structure of the multi-winding simultaneous/time-sharing power supply single-stage multi-input inverter. The circuit structure of the multi-winding single-stage multi-input boost type high-frequency link's inverter with simultaneous/time-sharing power supplies, the topology family and the energy management control strategy thereof are proposed. That is, the circuit structure is formed by connecting a plurality of mutually isolated high-frequency inverter circuits having an input filter and an energy storage inductor, a common output cycloconverter and filter circuit by a multi-input single-output high-frequency transformer.

The multi-winding single-stage multi-input boost type high-frequency link's inverter with simultaneous/time-sharing power supplies of the present disclosure can invert a plurality of unstable input direct voltages into a stable high-quality output AC power needed by a load. The present disclosure has the following characteristics. The multiple input direct current sources are connected to a common ground or a non-common ground. The transformer has multiple primary side windings and one secondary side winding. The isolation is performed between high-frequency inverter circuits. The high-frequency isolation is performed between the output and the input. The multiple input power sources supply power in a simultaneous/time-sharing manner in a switching cycle. The circuit topology is simple. The output cycloconverter and filter circuit is shared. The single-stage power conversion is performed. The voltage matching capacity is high. The power density is high. The conversion efficiency is high. The input current ripple is small. The output capacity is small and medium and the prospect of application is broad. The multi-winding single-stage multi-input boost type high-frequency link's inverter with simultaneous/time-sharing power supplies has superior comprehensive performance compared to that of the traditional multi-input inverter including two stages of the direct current converter and the inverter.

DETAILED DESCRIPTION OF THE EMBODIMENTS

Figure 1:
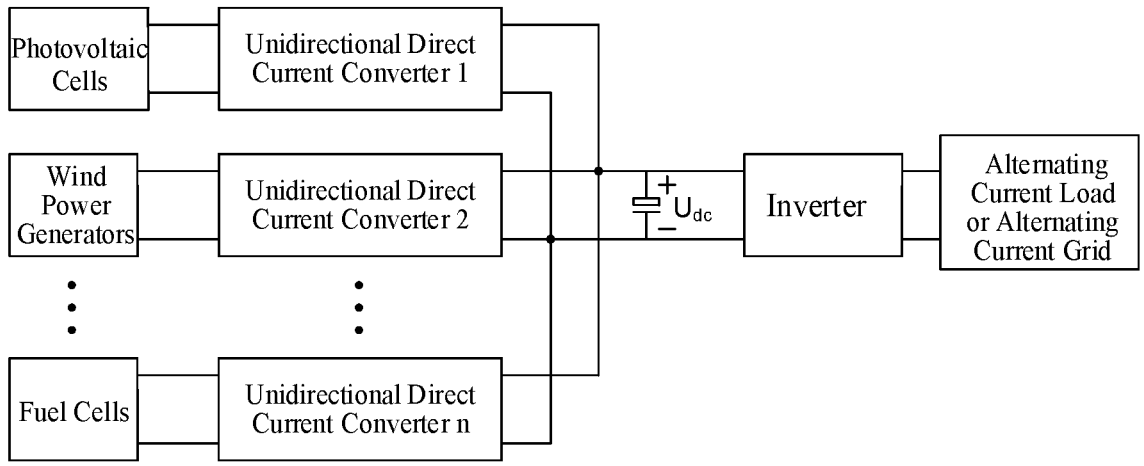
FIG. 1 shows a traditional two-stage new energy distributed power supply system with connecting multiple unidirectional direct current converters output ends in parallel.
Figure 2:
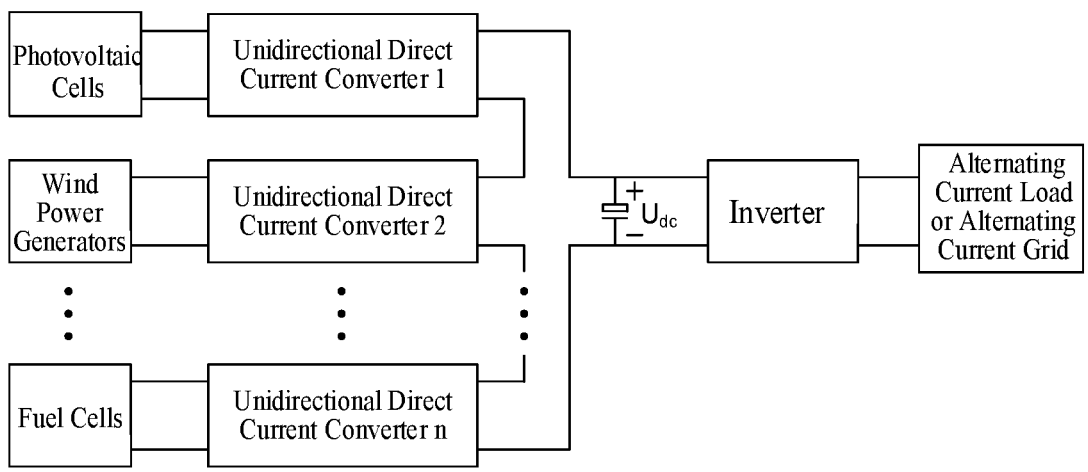
FIG. 2 shows a traditional two-stage new energy distributed power supply system with connecting multiple unidirectional direct current converters output ends in series.
Figure 3:
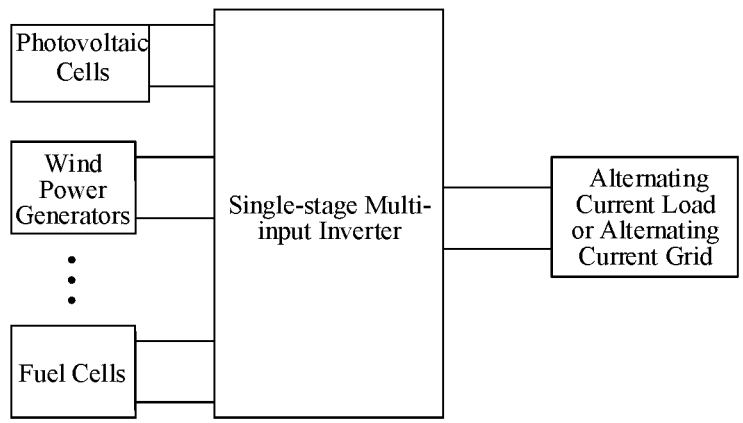
FIG. 3 is a schematic block diagram of a novel single-stage multi-input inverter.
Figure 4:
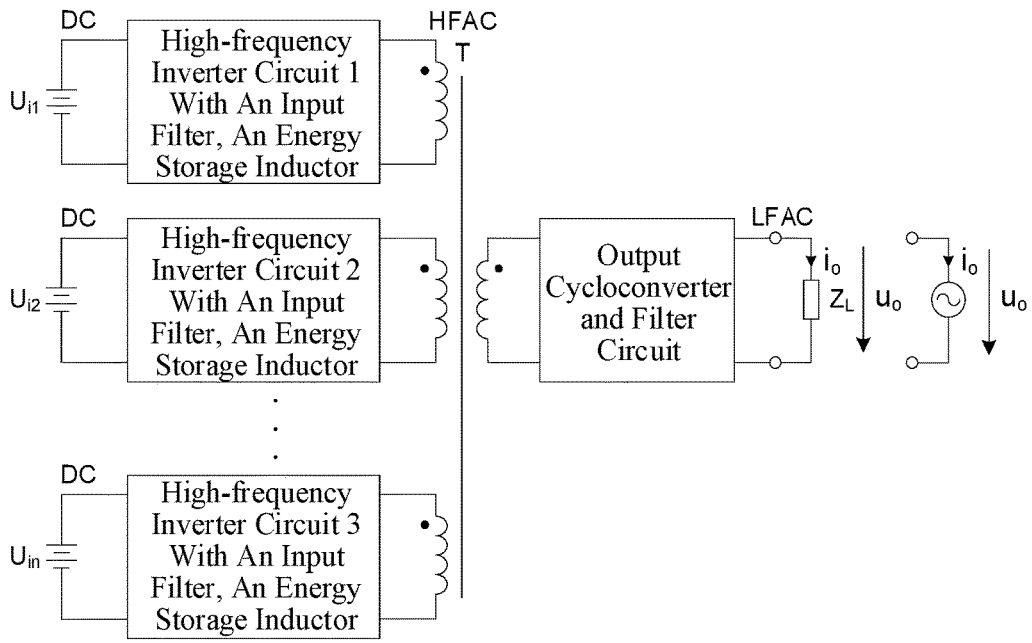
FIG. 4 is a schematic block diagram of a multi-winding single-stage multi-input boost type high-frequency link's inverter with simultaneous/time-sharing power supplies.
Figure 5:
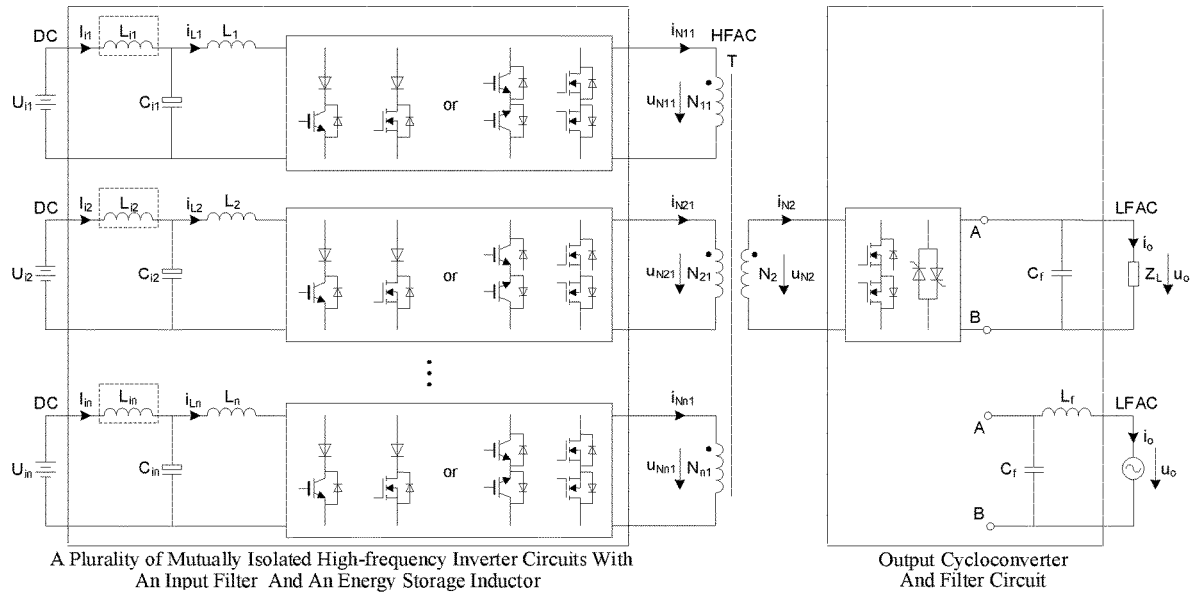
FIG. 5 is a circuit structure diagram of the multi-winding single-stage multi-input boost type high-frequency link's inverter with simultaneous/time-sharing power supplies.

The present disclosure will be further described hereinafter in the drawings and specific embodiments.

The multi-winding single-stage multi-input boost type high-frequency link's inverter with simultaneous/time-sharing power supplies is formed by connecting a plurality of mutually isolated high-frequency inverter circuits having an input filter and an energy storage inductor, a common output cycloconverter and filter circuit by a multi-input single-output high-frequency transformer. Each input end of the multi-input single-output high-frequency transformer is connected in one-to-one correspondence to the output end of each high-frequency inverter circuit. The output end of the multi-input single-output high-frequency transformer is connected to the input end of the output cycloconverter and filter circuit. Each high-frequency inverter circuit with the input filter and the energy storage inductor is composed of an input filter, an energy storage inductor and a single-input single-output high-frequency inverter circuit, which are successively connected in cascade. The output cycloconverter and filter circuit is composed of the cycloconverter and the output filter, which are successively connected in cascade. Each single-input single-output high-frequency inverter circuit is composed of a two-quadrant high-frequency power switch capable of withstanding bidirectional voltage stress and unidirectional current stress, or is composed of a four-quadrant high-frequency power switch capable of withstanding bidirectional voltage stress and bidirectional current stress. The cycloconverter is composed of multiple four-quadrant high-frequency power switches capable of withstanding bidirectional voltage stress and bidirectional current stress. The multiple input sources of the inverter can supply power to the load in a simultaneous/time-sharing manner in a high-frequency switching cycle.

Figure 6:
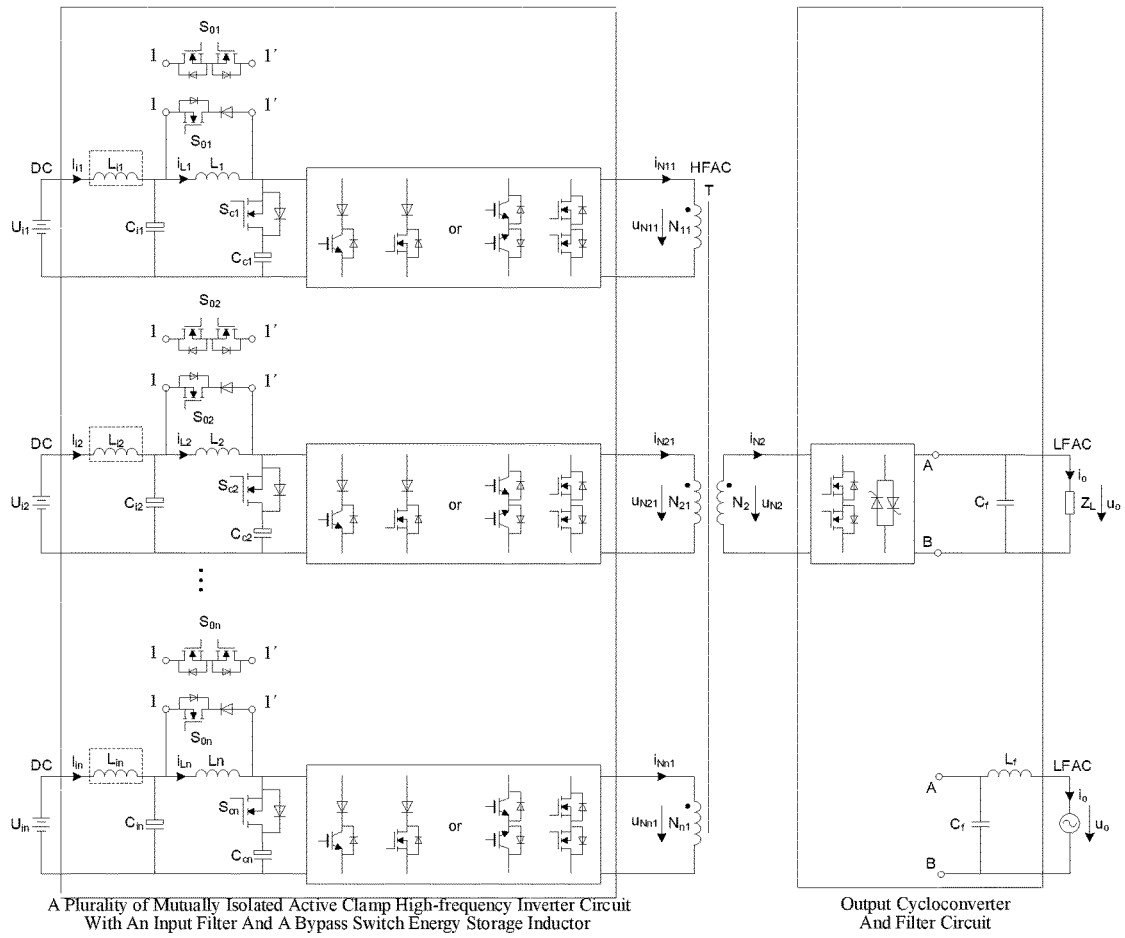
FIG. 6 is a circuit structure diagram of the multi-winding single-stage multi-input boost type high-frequency link's inverter with simultaneous/time-sharing power supplies with an energy storage inductor, a bypass switch and an active clamp circuit.
Figure 7:
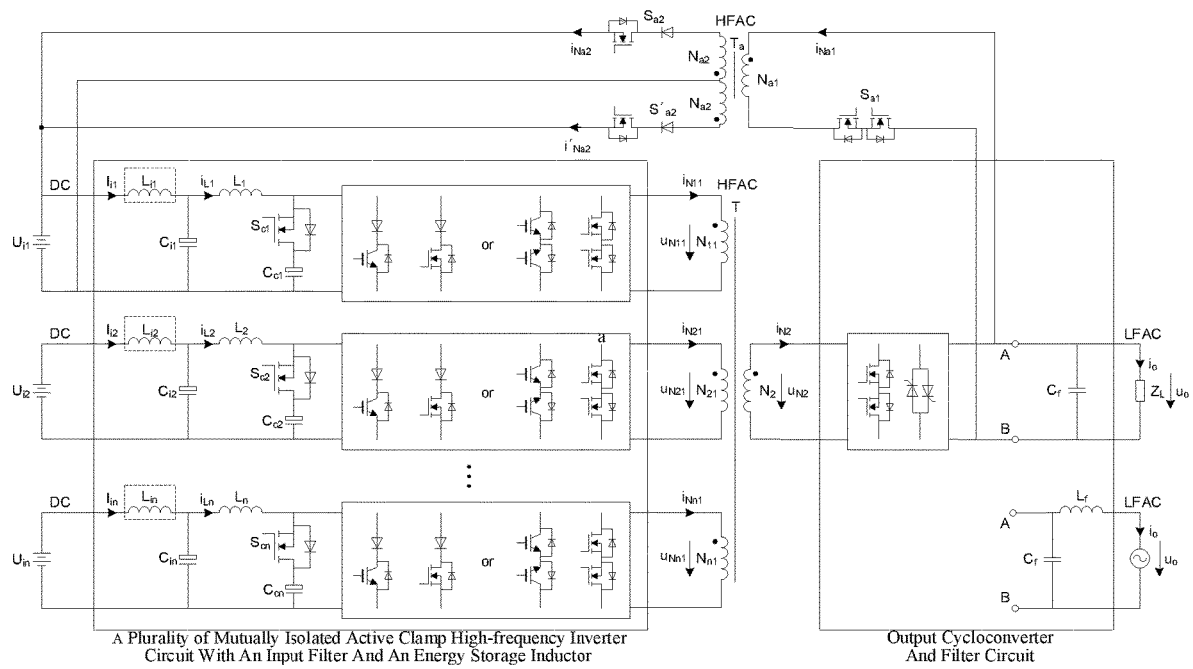
FIG. 7 is a circuit structure diagram of the multi-winding single-stage multi-input boost type high-frequency link's inverter with simultaneous/time-sharing power supplies with a flyback energy feedback circuit and the active clamp circuit.
Figure 8:
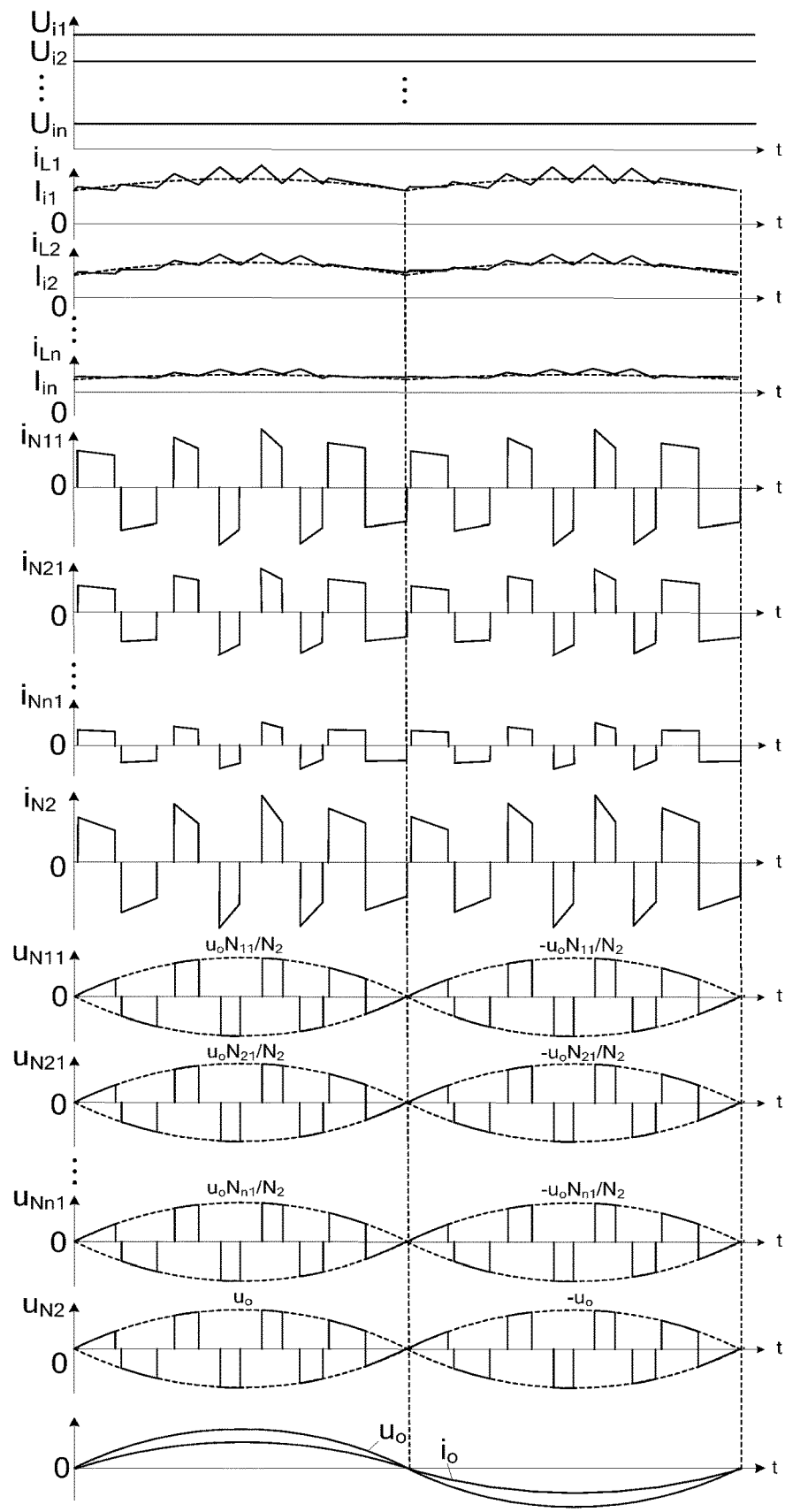
FIG. 8 is a steady-state schematic waveform diagram of single-cycle phase-shifting control of the multi-winding single-stage multi-input boost type high-frequency link's inverter with simultaneous/time-sharing power supplies in the course of supplying power in the manner of the same duty ratio.
Figure 9:
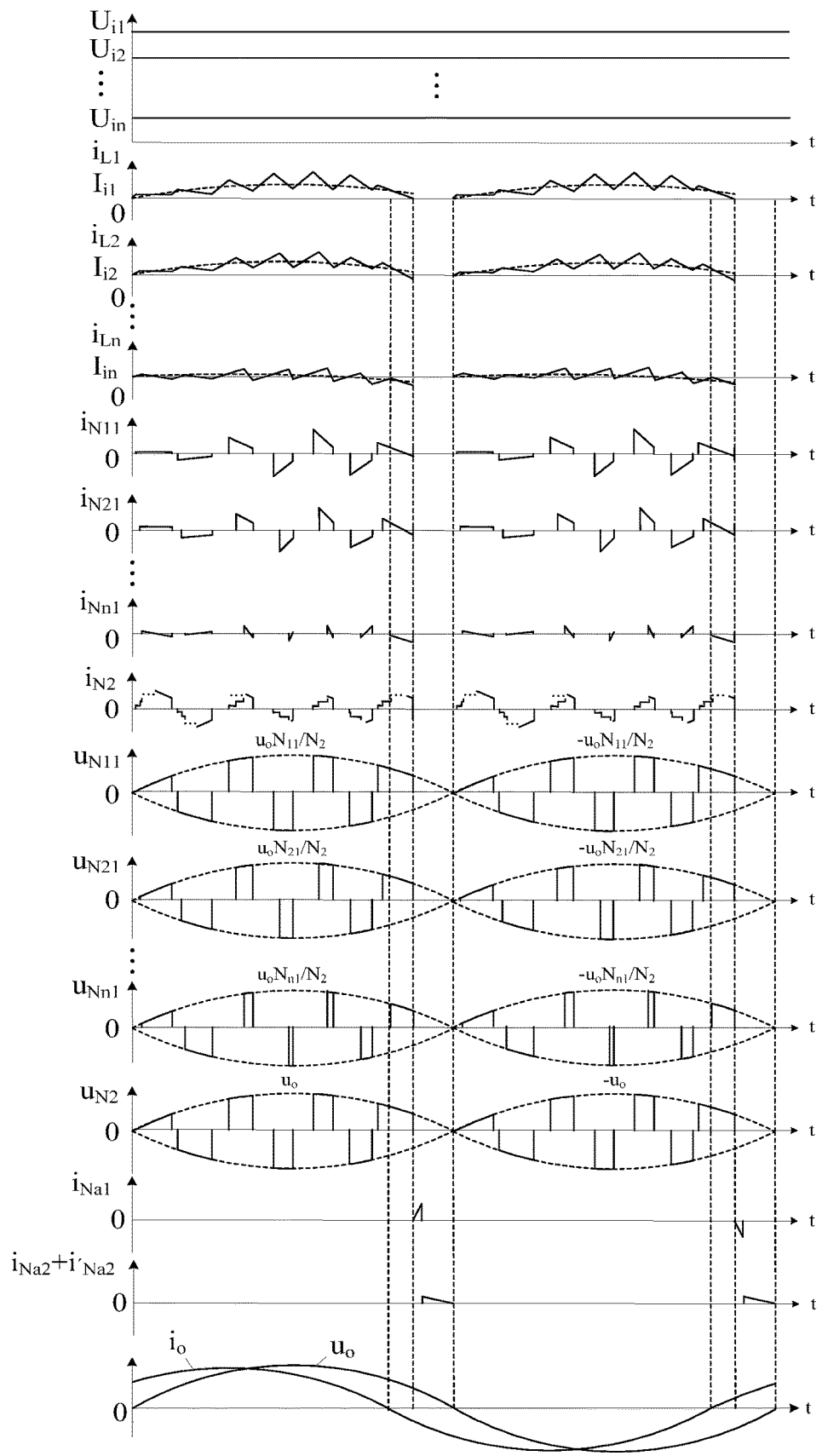
FIG. 9 is a steady-state schematic waveform diagram of phase-shift control of the multi-winding single-stage multi-input boost type high-frequency link's inverter with simultaneous/time-sharing power supplies in the course of supplying power in the manner of different duty ratios.
Figure 10:
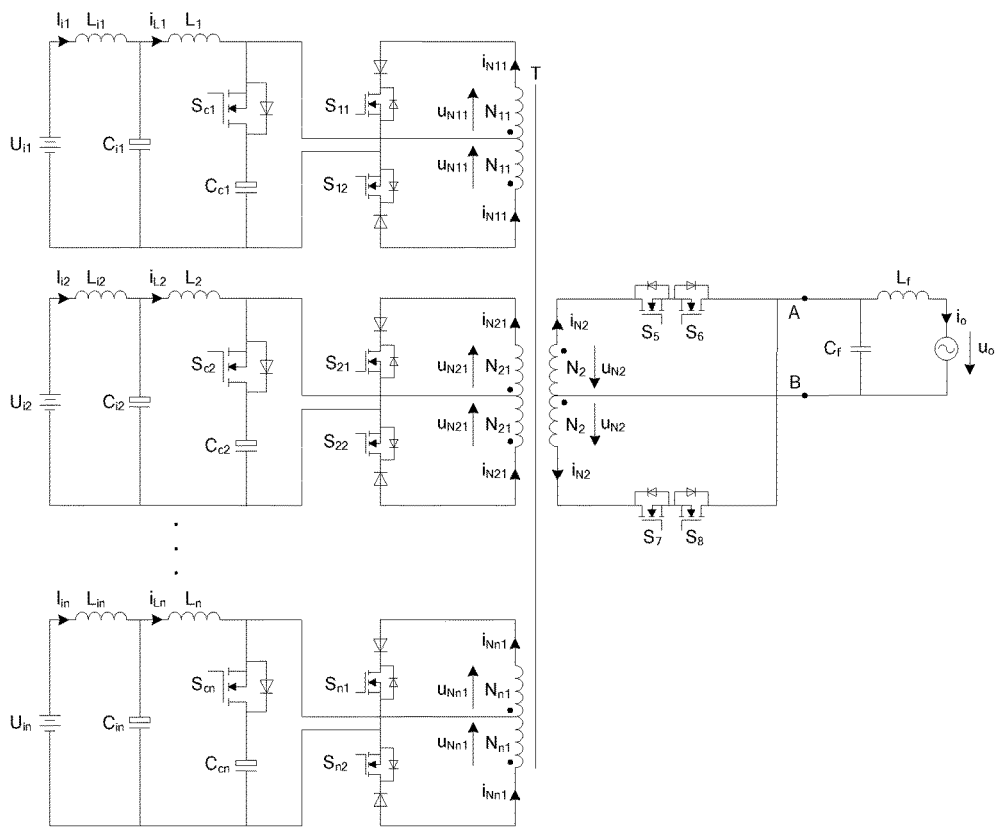
FIG. 10 is a multi-winding single-stage multi-input boost type high-frequency link's inverter with simultaneous/time-sharing power supplies circuit topology of embodiment 1 showing a push-pull full-wave unidirectional circuit schematic diagram.
Figure 11:
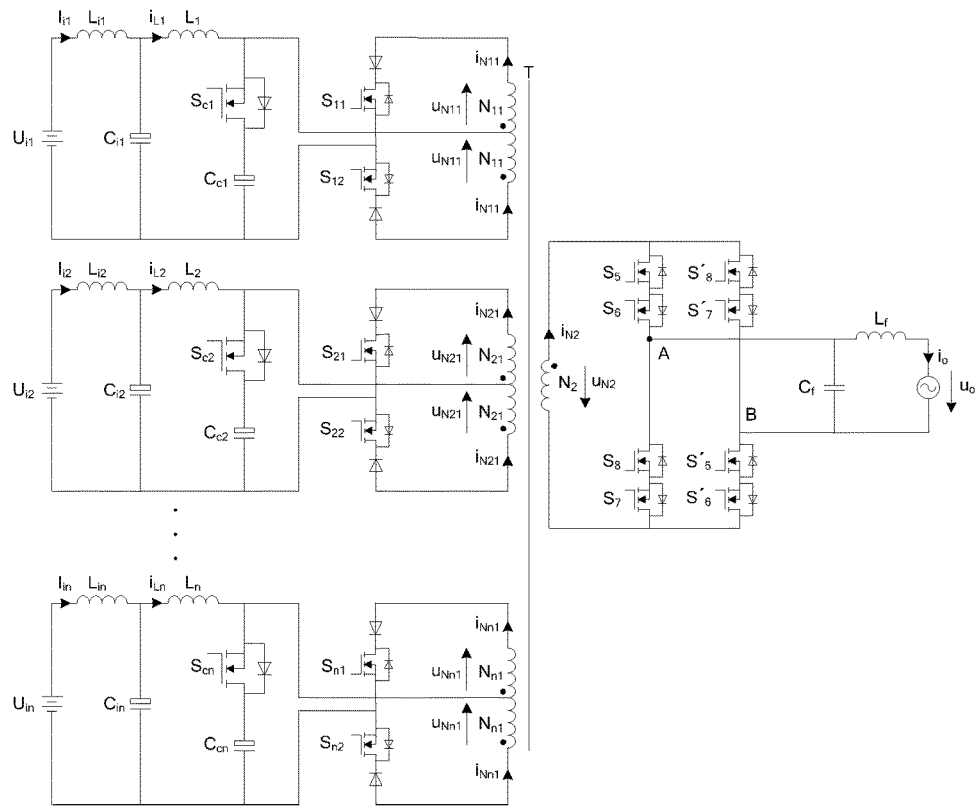
FIG. 11 is a schematic diagram of a circuit topology of embodiment 2 showing a push-pull full-bridge unidirectional circuit of the multi-winding single-stage multi-input boost type high-frequency link's inverter with simultaneous/time-sharing power supplies.
Figure 12:
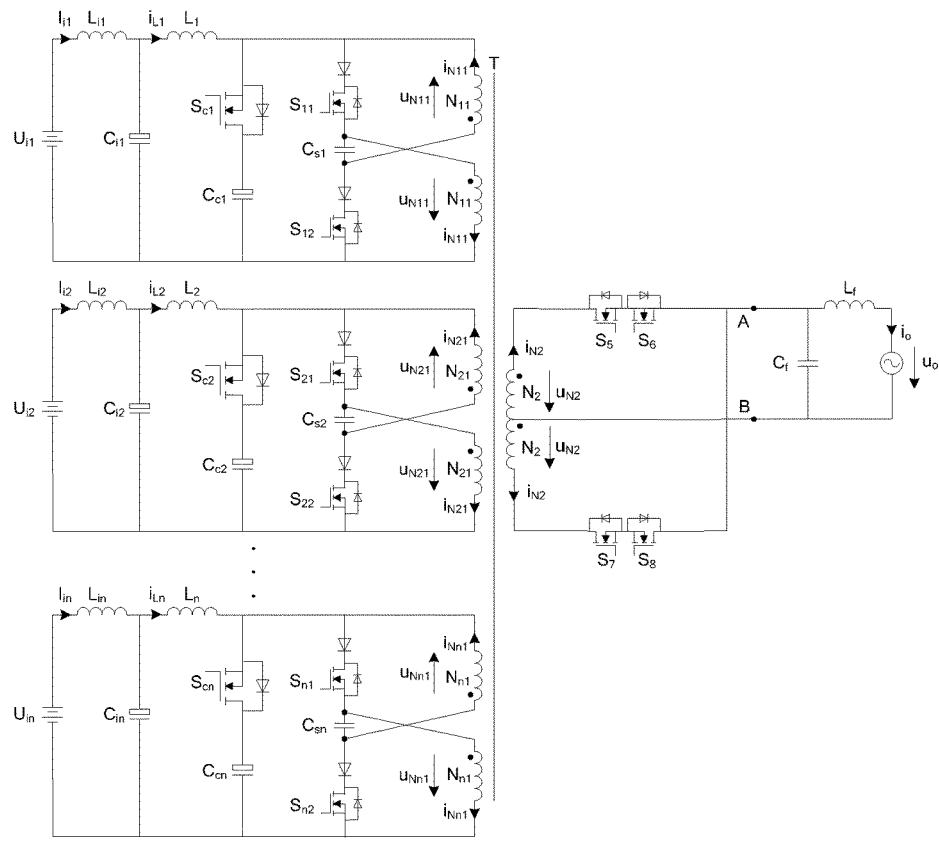
FIG. 12 is a schematic diagram of a circuit topology of embodiment 3 showing a push-pull forward full-wave unidirectional circuit of the multi-winding single-stage multi-input boost type high-frequency link's inverter with simultaneous/time-sharing power supplies.
Figure 13:
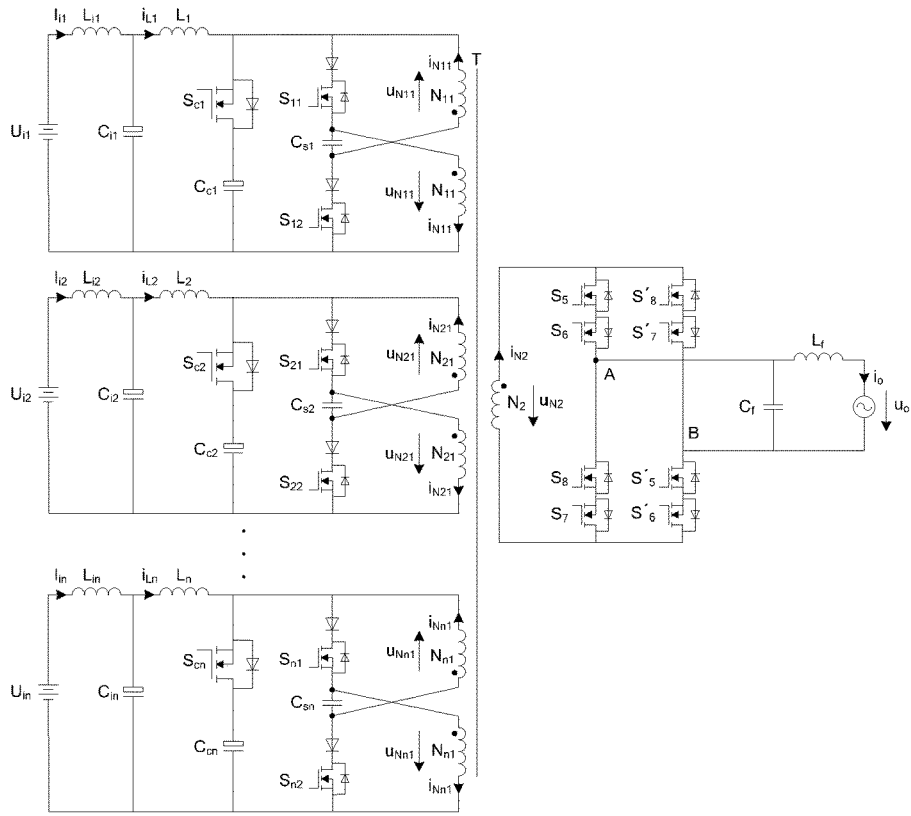
FIG. 13 is a schematic diagram of a circuit topology of embodiment 4 showing a push-pull forward full-bridge unidirectional circuit of the multi-winding single-stage multi-input boost type high-frequency link's inverter with simultaneous/time-sharing power supplies.

The block diagrams and circuit structure diagrams of the multi-winding unidirectional and bidirectional single-stage multi-input boost type high-frequency link's inverter with simultaneous/time-sharing power supplies, and the steady-state waveform schematic diagrams of the power supply output voltage instantaneous value feedback single-cycle phase-shift control in the course of supplying power in the manner of the same duty ratio (take unidirectional power flow as an embodiment) and the power supply output voltage input current instantaneous value feedback phase-shift control in the course of supplying power in the manner of different duty ratios (take bidirectional power flow as an embodiment) are respectively shown in FIGS. 4, 5, 6, 7, 8, and 9. In FIGS. 4, 5, 6, 7, 8, and 9, $U_{i1}$, $U_{i2}$, . . . , $U_{in}$ are respectively the n input direct voltage sources (n is a natural number greater than 1), $Z_L$ and $u_o$ are respectively the single-phase alternating current passive load and the single-phase alternating current grid, and $u_o$ and $i_o$ are respectively the single-phase output alternating voltage and the alternating current. Each mutually isolated high-frequency inverter circuit with the input filter and the energy storage inductor is composed of the input filter, the energy storage inductor and the single-input single-output high-frequency inverter circuit, which are successively connected in cascade. Specifically, the single-input single-output high-frequency inverter circuit is composed of a four-quadrant high-frequency power switch, such as Metal-Oxide-Semiconductor Field-Effect Transistor (MOSFET), Insulated Gate Bipolar Transistor (IGBT), Giant Transistor (GTR), which can withstand bidirectional voltage stress and bidirectional current stress and be used for the case where the output current and the output voltage are in different phases. The single-input single-output high-frequency inverter circuit is composed of a two-quadrant high-frequency power switch (connecting select power devices such as MOSFET, IGBT, GTR and the fast recovery diodes in series) capable of withstanding bidirectional voltage stress and unidirectional current stress for the case where the output current and the output voltage are in the same phase. The output cycloconverter and filter circuit is composed of the cycloconverter and the output filter. The cycloconverter and the output filter are successively connected in cascade. Specifically, the cycloconverter is composed of multiple four-quadrant high-frequency power switches capable of withstanding bidirectional voltage stress and bidirectional current stress. The n input filters are LC filters (including filter inductors $L_{i1}, L_{i2}, \ldots, L_{in}$ within the dashed-line box) or capacitor filters (excluding filter inductors $L_{i1}, L_{i2}, \ldots, L_{in}$ within the dashed-line box). When LC filters are employed, the n input direct current will be smoother. The boost type converter is a voltage increasing converter, wherein $|u_O|>U_{in}N_2/N_{n1}$ (n=1, 2, ..., n) in each high-frequency switching cycle. In order to ensure the output voltage waveform quality during the output sinusoidal voltage drops and $|u_O|\leq U_{in}N_2/N_{n1}$ (n=1, 2, ..., n), the following effective measures are taken. (1) Based on the circuit structure shown in FIG. 5, the energy storage inductors $L_1, L_2 \ldots L_n$, are attached with the bypass switches $S_{01}$, $S_{02}, \ldots, S_{0n}$ including a two-quadrant high-frequency power switch capable of withstanding bidirectional voltage stress and unidirectional current stress, or including a four-quadrant high-frequency power switch capable of withstanding bidirectional voltage stress and bidirectional current stress. During this period or when the current in the input direct current side exceeds a predetermined value, the energy storage switch of the high-frequency inverter circuit is stopped and the bypass switch $S_{01}, S_{02} \ldots S_{0n}$ is started up to provide a freewheeling path for the energy storage inductor, and the energy release path of the input source and energy storage inductor remains unchanged. FIG. 6 shows the circuit structure of the multi-winding single-stage multi-input boost type high-frequency link's inverter with simultaneous/time-sharing power supplies with adding the energy storage inductor bypass switches. (2) Based on the circuit structure shown in FIG. 5, a small-capacity flyback high-frequency link's energy feedback circuit is added and composed of a cycloconverter (including a four-quadrant high-frequency power switch $S_{a1}$), a high-frequency energy storage transformer $T_a$ with a secondary side center tap, and a rectifier (including two two-quadrant high-frequency power switch, $S_{a2}$ and $S'_{a2}$, capable of withstanding bidirectional voltage stress and unidirectional current stress), which are successively connected in cascade. During this period, the main power channel is stopped and the small-capacity flyback high-frequency link's energy feedback circuit is started up to feed back the excess energy from the output side to the input power side (such as the first input source). FIG. 7 shows the circuit structure of the multi-winding single-stage multi-input boost type high-frequency link's inverter with simultaneous/time-sharing power supplies with adding a flyback energy feedback circuit. As shown in FIGS. 6 and 7, the additional active clamp circuit in which $S_{c1}$ and $C_{c1}$ are connected in series, $S_{c2}$ and $C_{c2}$ are connected in series, ..., $S_{cn}$ and $C_{cn}$ are connected in series, is configured to suppress the voltage spike caused by the leakage inductance of the high-frequency transformer blocking energy release of the energy storage inductor. The improved active clamp circuit (wherein the cathodes of the added parallel-connected diodes $D_{c1}, D_{c2}, \ldots, D_{cn}$ are respectively connected to the source electrodes of $S_{c1}$, $S_{c2}, \ldots, S_{cn}$, and the anodes of $D_{c1}, D_{c2}, \ldots, D_{cn}$ are respectively connected to the negative electrodes of $C_{c1}$, $C_{c2}, \ldots, C_{cn}$) is added to further suppress the voltage spike. The n high-frequency inverter circuits invert the high-frequency pulsating direct currents $i_{L1}, i_{L2}, \ldots, i_{Ln}$ (the amplitude thereof is a sine half-wave envelope) in the n energy storage inductors $L_1, L_2, \ldots, L_n$ into the bipolar three-state high-frequency pulse currents $i_{N11}, i_{N21}, \ldots i_{Nn1}$. After electrical isolation, transmission and current matching of the high-frequency transformer T, the bipolar three-state multi-level high-frequency pulse currents pass through the cycloconverter and the output filter capacitors $C_f$ and $C_f$-$L_f$ to obtain the high-quality sinusoidal alternating voltage $u_o$ or sinusoidal alternating current $i_o$ on the single-phase alternating current passive load or the single-phase alternating current grid. The high-frequency pulsating direct currents in the energy storage inductors $L_1, L_2, \ldots, L_n$ pass through the input filters $L_{i1}$-$C_{i1}$, $L_{i2}$-$C_{i2}$, ..., $L_{in}$-$C_{in}$ or $C_{i1}, C_{i2}, \ldots, C_{in}$ to obtain the smooth input direct currents $I_{i1}, I_{i2}, \ldots, I_{in}$ from the n input direct current power sources $U_{i2}, \ldots, U_{in}$.

The multi-winding single-stage multi-input boost type high-frequency link's inverter with simultaneous/time-sharing power supplies is the boost type (current type) inverter, and the n input sources supply power to the load in a simultaneous or time-sharing manner. The principle of the inverter is equivalent to the superposition of currents at the output end of multiple boost type single-input inverters. Namely, the relationship between the output voltage $u_o$ and the input direct voltage ($U_{i1}, U_{i2}, \ldots, U_{in}$), the high-frequency transformer turn ratios ($N_2/N_{11}, N_2/N_{21}, \ldots, N_2/N_{n1}$), the duty ratios ($d_1, d_2, \ldots, d_j, \ldots, d_n$) is $u_o = U_{i1}N_2/[N_{11}(1-d_1)] = U_{i2}N_2/[N_{12}(1-d_2)] = \ldots = U_{in}N_2/[N_{1n}(1-d_n)]$. If the duty ratio ($d_1, d_2, \ldots, d_j, \ldots, d_n$) and the high-frequency transformer turn ratios ($N_2/N_{11}, N_2/N_{21}, \ldots, N_2/N_{n1}$) are appropriate, the output voltage $u_o$ can be greater than, equal to, or less than $U_{i1}, U_{i2}, \ldots, U_{in}$. The high-frequency transformer in the inverter not only improves the safety, reliability and electromagnetic compatibility of the inverter operation, but also can match the output voltage and input voltage of the inverter, which achieves the technical effect that the output voltage of the inverter is higher than, equal to or lower than the input direct voltage $U_{i1}, U_{i2}, \ldots, U_{in}$, and greatly broadens the application field. Since $0<d_1, d_2, \ldots, d_n<1$, $u_o>U_{i1}N_2/N_{11}$, $u_o>U_{i2}N_2/N_{12}, \ldots, u_o>U_{in}N_2/N_{1n}$, that is, the output direct voltage $u_o$ is always higher than the product ($U_{11}N_2/N_{11}$, $U_{i2}N_2/N_{12}, \ldots, U_{in}N_2/N_{1n}$) of the input direct voltage $U_{i1}, U_{i2}, \ldots, U_{in}$ and the high-frequency transformer turn ratio $N_2/N_{11}, N_2/N_{12}, \ldots, N_2/N_{1n}$ respectively. Since the inverter has the single-stage circuit structure, the transformer has multiple primary windings and one secondary winding and the operating frequency is high-frequency. Thus, this kind of inverter is referred to as a multi-winding simultaneous/time-sharing current power supply boost type (current type) single-stage multi-input high-frequency link's inverter. When the inverter works in the same duty ratio, $d_1=d_2= \ldots =d_n$, the n input sources supply power to the alternating current load in a high-frequency switching cycle only in the simultaneous mode. When the inverter works in different duty ratios, $d_1 \neq d_2 \neq \ldots \neq d_n$, the n input sources supply power to the alternating current load in a high-frequency switching cycle in the simultaneous mode or in the time-sharing mode.

The multi-winding single-stage multi-input boost type high-frequency link's inverter with simultaneous/time-sharing power supplies of the present disclosure shares a transformer and an output cycloconverter and filter circuit, which are essentially different from the circuit structure of the traditional multi-input inverter formed by connecting the direct current converter and the inverter in two-stage cascade. Therefore, the inverter of the present disclosure is novel and creative, and has the following advantages. The output and input high-frequency isolation is performed. The multiple input sources are connected to a common ground or a non-common ground. The multiple input sources supply power in a simultaneous/time-sharing manner. The circuit topology is simple. The single-stage power conversion is performed. The input voltage configuration is flexible. The power density is high. The conversion efficiency is high (means low energy loss). The input current ripple is small. The output capacity is small to medium. The cost is low and the application prospect is broad. The inverter of the present disclosure is an ideal energy-saving and consumption-reducing single-stage multi-input inverter and is of great value to construct an energy-saving and economical society.

Figure 14:
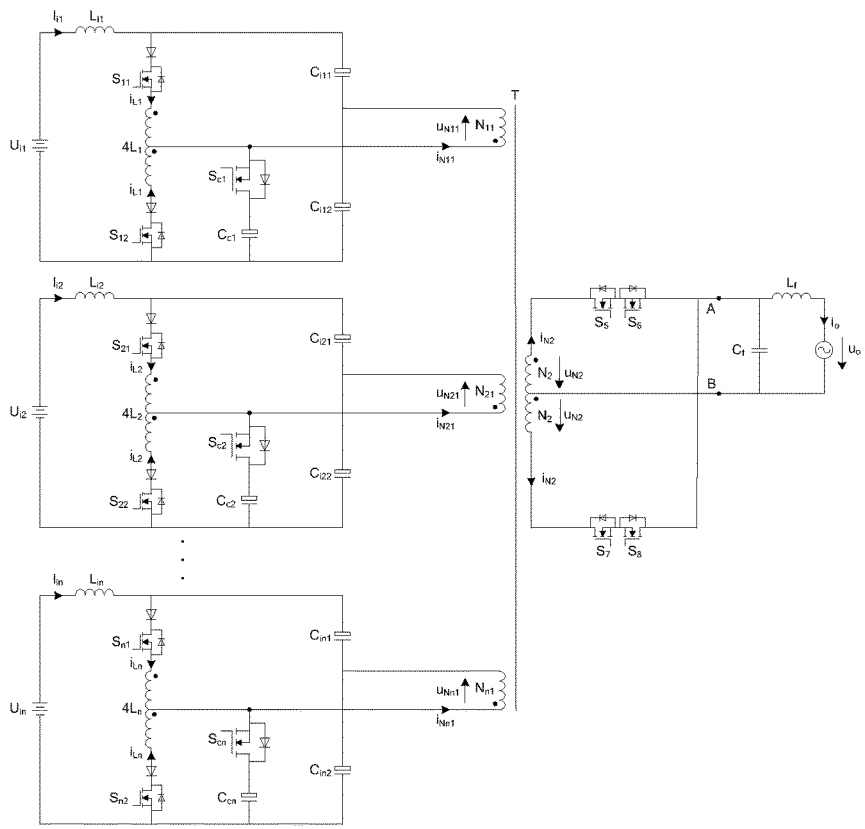
FIG. 14 is a schematic diagram of a circuit topology of embodiment 5 showing a half-bridge full-wave unidirectional circuit of the multi-winding single-stage multi-input boost type high-frequency link's inverter with simultaneous/time-sharing power supplies.
Figure 15:
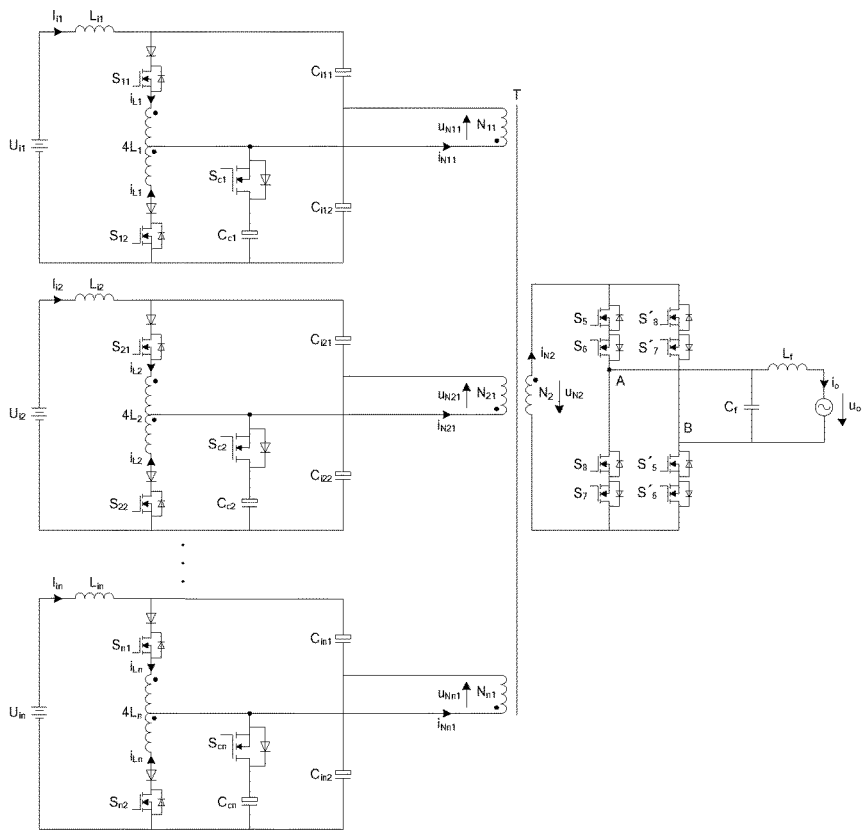
FIG. 15 is a schematic diagram of a circuit topology embodiment of 6 showing a half-bridge full-bridge unidirectional circuit of the multi-winding single-stage multi-input boost type high-frequency link's inverter with simultaneous/time-sharing power supplies.
Figure 16:
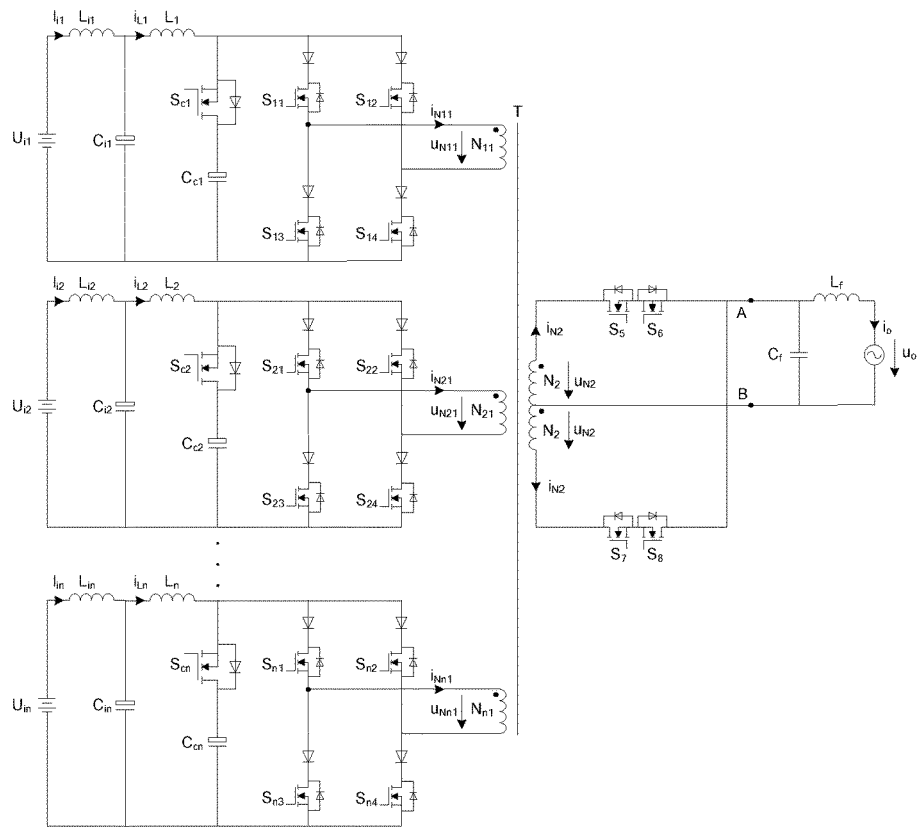
FIG. 16 is a schematic diagram of a circuit topology of embodiment 7 showing a full-bridge full-wave unidirectional circuit of the multi-winding single-stage multi-input boost type high-frequency link's inverter with simultaneous/time-sharing power supplies.
Figure 17:
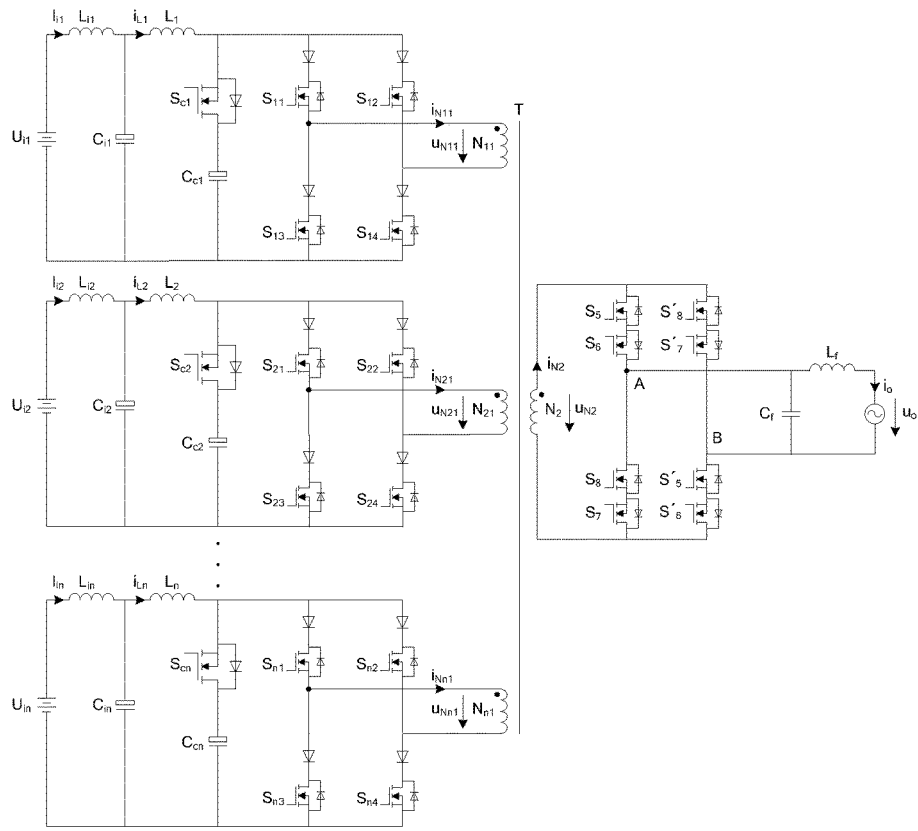
FIG. 17 is a schematic diagram of a circuit topology of embodiment 8 showing a full-bridge full-bridge unidirectional circuit of the multi-winding single-stage multi-input boost type high-frequency link's inverter with simultaneous/time-sharing power supplies.
Figure 18:
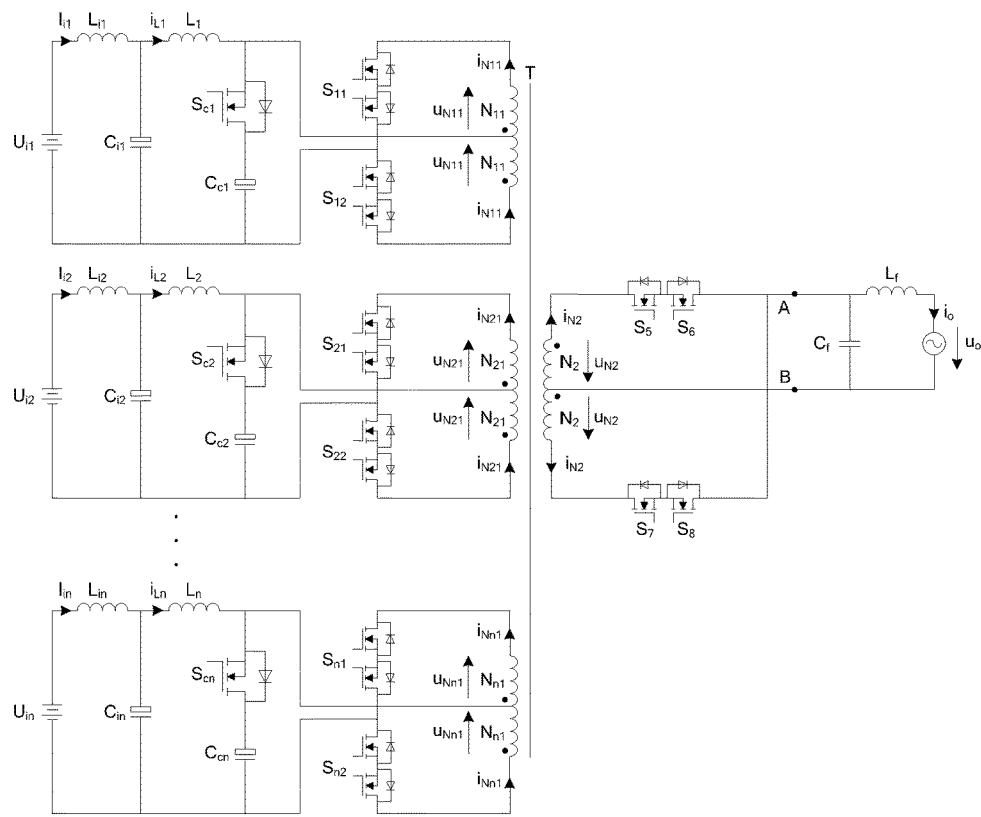
FIG. 18 is a schematic diagram of a circuit topology of embodiment 9 showing a push-pull full-wave bidirectional circuit of the multi-winding single-stage multi-input boost type high-frequency link's inverter with simultaneous/time-sharing power supplies.
Figure 19:
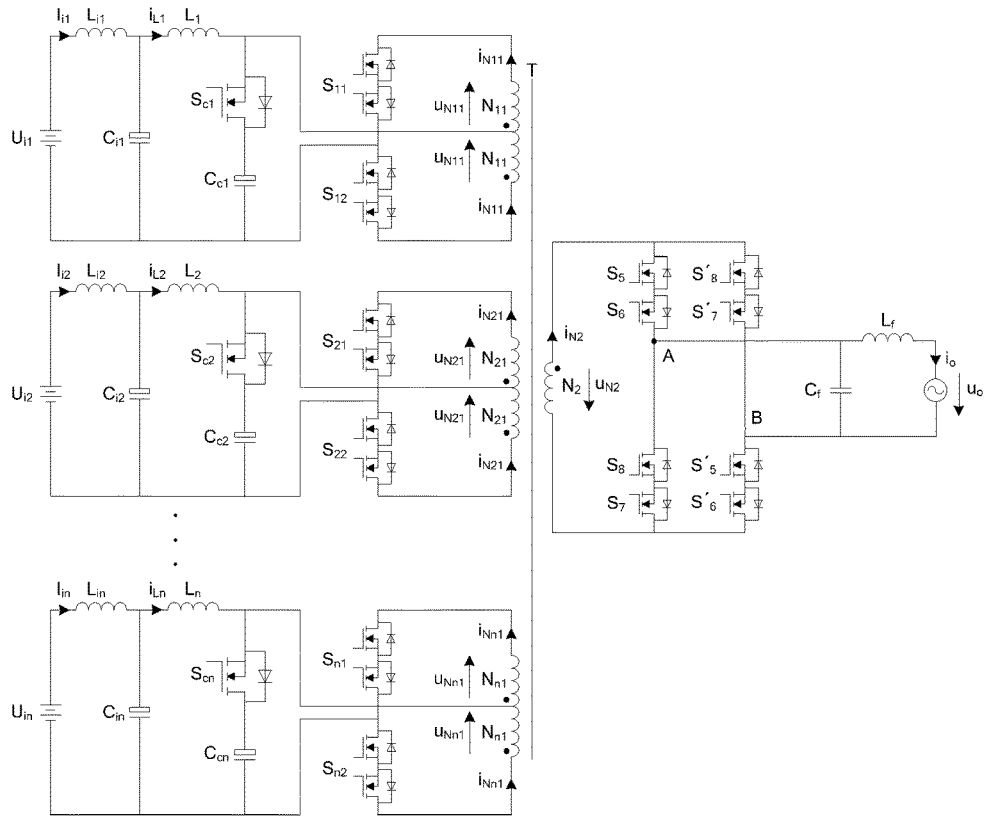
FIG. 19 is a schematic diagram of a circuit topology of embodiment 10 showing a push-pull full-bridge bidirectional circuit of the multi-winding single-stage multi-input boost type high-frequency link's inverter with simultaneous/time-sharing power supplies.
Figure 20:
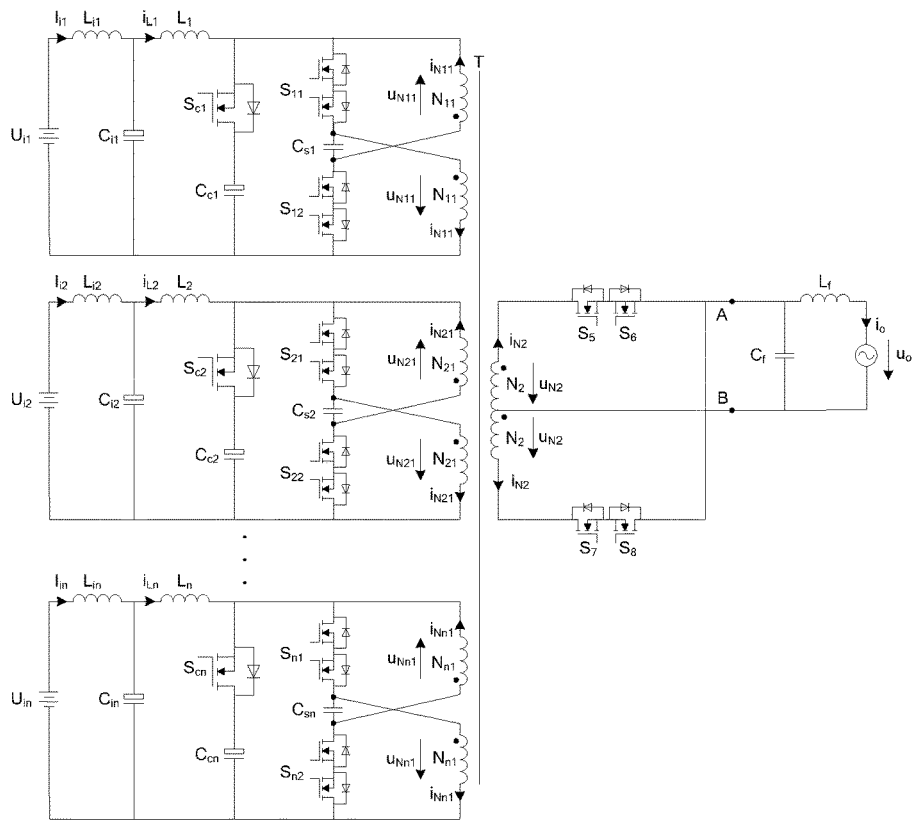
FIG. 20 is a schematic diagram of a circuit topology of embodiment 11 showing a push-pull forward full-wave bidirectional circuit of the multi-winding single-stage multi-input boost type high-frequency link's inverter with simultaneous/time-sharing power supplies.
Figure 21:
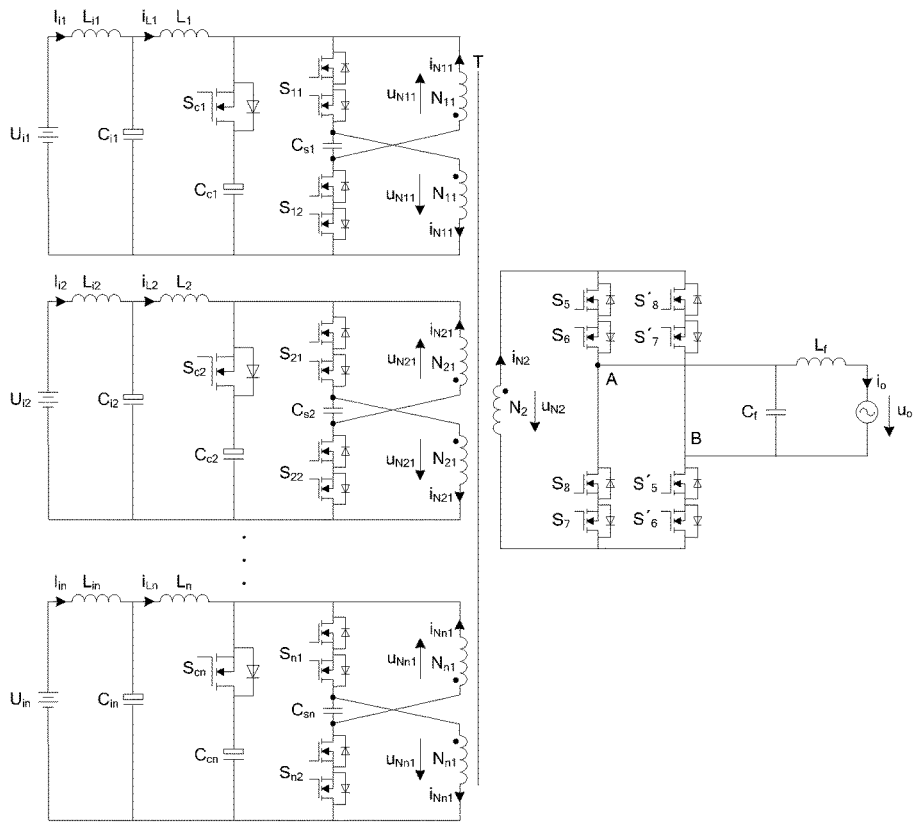
FIG. 21 is a schematic diagram of a circuit topology of embodiment 12 showing a push-pull forward excitation full-bridge bidirectional circuit of the multi-winding single-stage multi-input boost type high-frequency link's inverter with simultaneous/time-sharing power supplies.
Figure 22:
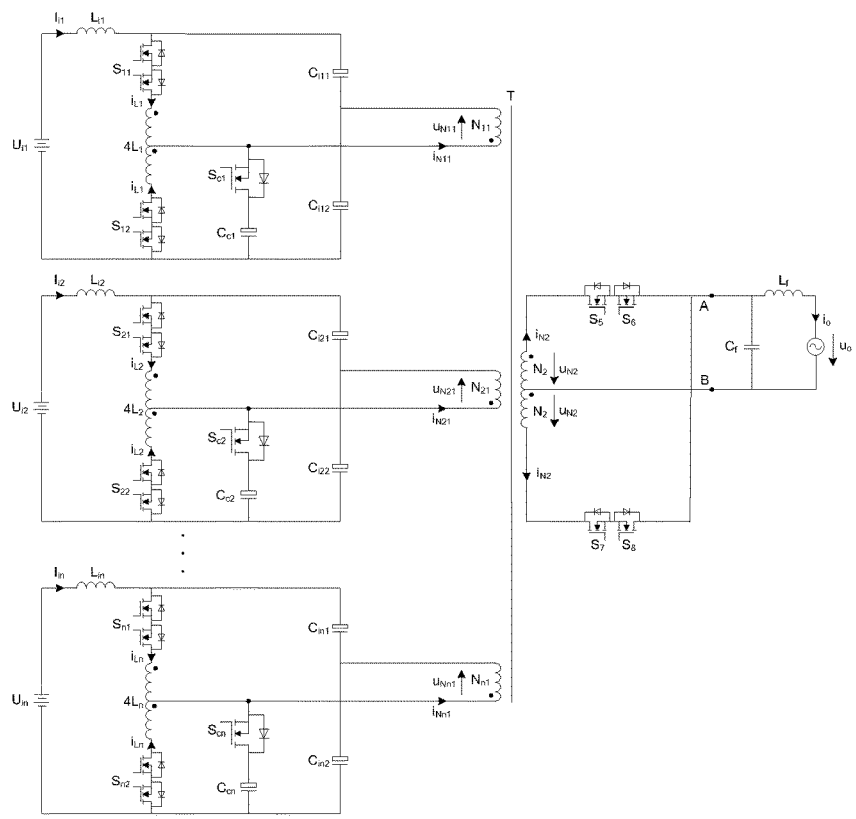
FIG. 22 is a schematic diagram of a circuit topology of embodiment 13 showing a half-bridge full-wave bidirectional circuit of the multi-winding single-stage multi-input boost type high-frequency link's inverter with simultaneous/time-sharing power supplies circuit.
Figure 23:
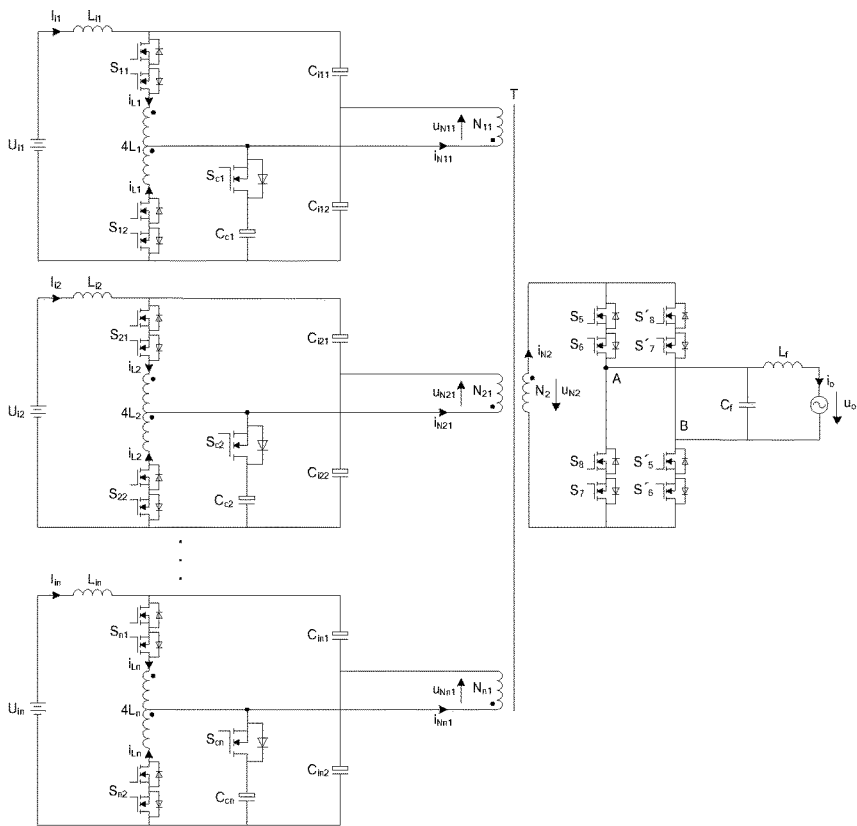
FIG. 23 is a schematic diagram of a circuit topology of embodiment 14 showing a half-bridge full-bridge bidirectional circuit of the multi-winding single-stage multi-input boost type high-frequency link's inverter with simultaneous/time-sharing power supplies.
Figure 24:
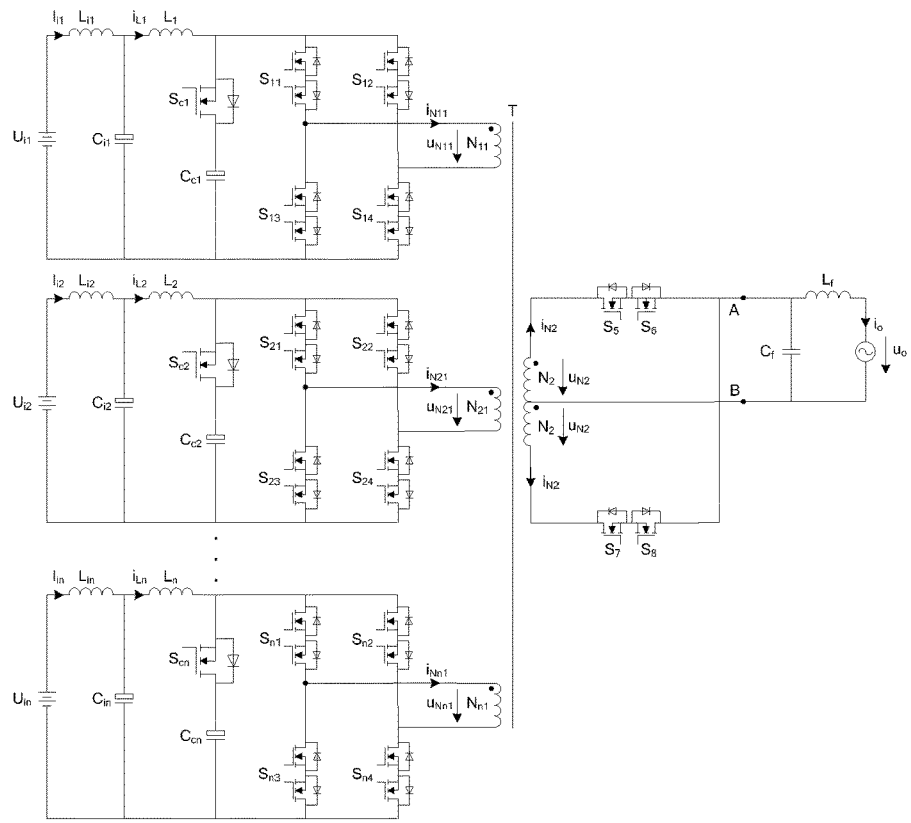
FIG. 24 is a schematic diagram of a circuit topology of embodiment 15 showing a full-bridge full-wave bidirectional circuit of the multi-winding single-stage multi-input boost type high-frequency link's inverter with simultaneous/time-sharing power supplies.
Figure 25:
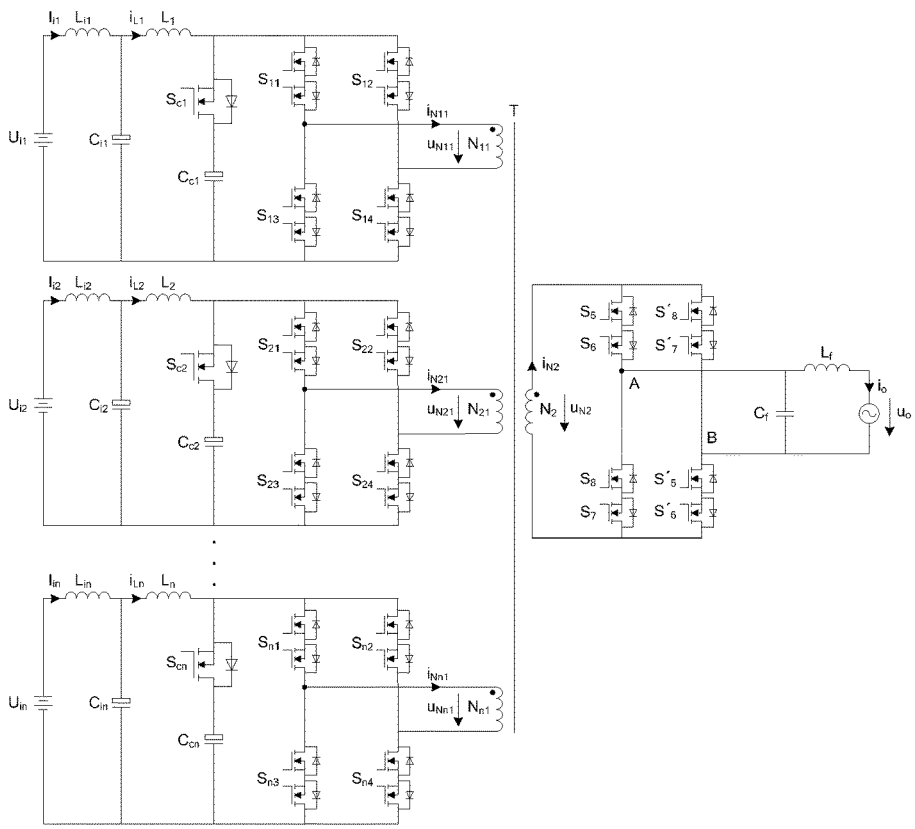
FIG. 25 is a schematic diagram of a circuit topology of embodiment 16 showing a full-bridge full-bridge bidirectional circuit of the multi-winding single-stage multi-input boost type high-frequency link's inverter with simultaneous/time-sharing power supplies.

Embodiments of circuit topologies family of the multi-winding single-stage multi-input boost type high-frequency link's inverter with simultaneous/time-sharing power supplies are shown in FIGS. 10, 11, 12, 13, 14, 15, 16, 17, 18, 19, 20, 21, 22, 23, 24 and 25. As is shown in FIGS. 10-17, the circuit topologies family embodiments of the multi-winding unidirectional single-stage multi-input boost type high-frequency link's inverter with simultaneous/time-sharing power supplies belong to the unidirectional power flow circuit topology. As is shown in FIGS. 18-25, the circuit topologies family embodiments of the multi-winding bidirectional single-stage multi-input boost type high-frequency link's inverter with simultaneous/time-sharing power supplies belong to the bidirectional power flow circuit topology. The push-pull circuit shown in FIGS. 10 and 11, the push-pull forward circuit shown in FIGS. 12 and 13, and the half-bridge circuit shown in FIGS. 14 and 15 are formed by 2n two-quadrant high-frequency power switches capable of withstanding bidirectional voltage stress and unidirectional current stress, and 2 or 4 four-quadrant high-frequency power switches, respectively. The full-bridge circuit shown in FIGS. 16 and 17 are formed by 4n two-quadrant high-frequency power switches capable of withstanding bidirectional voltage stress and unidirectional current stress, and 2 or 4 four-quadrant high-frequency power switches, respectively. The push-pull circuit shown in FIGS. 18 and 19, the push-pull forward excitation circuit shown in FIGS. 20 and 21, and the half-bridge circuit shown in FIGS. 22 and 23 are formed by 2(n+1) or 2(n+2) four-quadrant high-frequency power switches capable of withstanding bidirectional voltage stress and bidirectional current stress, respectively. The full-bridge circuit shown in FIGS. 24 and 25 are formed by 4(n+½) or 4(n+1) four-quadrant high-frequency power switches capable of withstanding bidirectional voltage stress and bidirectional current stress, respectively. The circuits limitations, the circuit when the input filter is a capacitive filter is not given. The circuits shown in FIGS. 10-25 only show the circuit diagram of the CL output filter applied to the alternating current grid load, and do not show the circuit diagram of the output capacitor filter applied to the passive alternating current load. The circuits shown in FIGS. 10-25 only show the topology corresponding to the circuit structure in FIG. 5, while the topologies corresponding to the circuit structures shown in FIGS. 6 and 7 respectively, which add the energy storage inductor bypass switch and the small-capacity flyback high-frequency link's energy feedback circuit, are not drawn. The voltage stress of the power switch in the 16 topology embodiments of the umulti-winding nidirectional and bidirectional single-stage multi-input boost type high-frequency link's inverter with simultaneous/time-sharing power supplies is shown in Table 1. In Table 1, $U_o$ is the output voltage effective value. The push-pull full-wave circuit, the push-pull forward full-wave circuit, the half-bridge full-wave circuit, the full-bridge full-wave circuit are suitable for the low-voltage high-current output conversion. The push-pull bridge circuit, the push-pull forward full-bridge circuit, the half-bridge circuit, the full-bridge circuit are suitable for high-voltage low-current output conversion. This circuit topology family is used for converting a plurality of unstable input direct voltages connected to a common ground or a non-common ground into a required high-quality output AC power having a stable voltage, which can be used to form a novel single-stage multiple new energy distributed power supply system possessing excellent performance and broad application prospects. For example, various input sources such as photovoltaic cell 40-60 VDC/220V50HzAC or 115V400HzAC, 10 kw proton exchange membrane fuel cell 85-120V/220V50HzAC or 115V400HzAC, small and medium-sized household wind power generation 24-36-48 VDC/220V50HzAC or 115V40HzAC, large wind power generation 510 VDC/220V50HzAC or 115V400HzAC supply power to the alternating current load or the alternating current grid.

TABLE 1 the power switch voltage stress of 16 topology embodiments of the multi-winding unidirectional and bidirectional single-stage multi-input boost type high-frequency link's inverter with simultaneous/time-sharing power supplies

| circuit topology | voltage stress | power switch | | | |
|---|---|---|---|---|---|
| | | $S_{11}$ and $S_{12}$, $S_{21}$ and $S_{22}$, ..., $S_{n1}$ and $S_{n2}$ | $S_{13}$ and $S_{14}$, $S_{23}$ and $S_{24}$, ..., $S_{n3}$ and $S_{n4}$ | $S_{c1}, S_{c2}, \ldots, S_{cn}$ | $S_5(S'_5), S_6(S'_6), S_7(S'_7), S_8(S'_8)$ |
| push-pull circuit | full-wave bridge | $2\sqrt{2}U_0 N_{11}/N_2$, $2\sqrt{2}U_0 N_{21}/N_2$, ..., | / | $\sqrt{2}U_0 N_{11}/N_2$, $\sqrt{2}U_0 N_{21}/N_2$, ..., | $2\sqrt{2}U_0$ $\sqrt{2}U_0$ |
| push-pull forward circuit | full-wave bridge | $2\sqrt{2}U_0 N_{n1}/N_2$ | | $\sqrt{2}U_0 N_{n1}/N_2$ $\sqrt{2}U_0 N_{11}/N_2 + U_{i1}/2$, | $2\sqrt{2}U_0$ $\sqrt{2}U_0$ |
| half-bridge circuit | full-wave bridge | | | $\sqrt{2}U_0 N_{12}/N_2 + U_{i2}/2$, ..., $\sqrt{2}U_0 N_{1n}/N_2 + U_{in}/2$ | $2\sqrt{2}U_0$ $\sqrt{2}U_0$ |
| full-bridge circuit | full-wave bridge | | $\sqrt{2}U_0 N_{11}/N_2, \sqrt{2}U_0 N_{21}/N_2, \ldots, \sqrt{2}U_0 N_{n1}/N_2$ | | $2\sqrt{2}U_0$ $\sqrt{2}U_0$ | shown in FIGS. 10-25 all include n two-quadrant high-frequency clamp switches capable of withstanding unidirectional voltage stress and bidirectional current stress. It should be noted that the circuits shown in FIGS. 10-25 indicates the case where the input filter is an LC filter (the input filter capacitors of the half-bridge circuit shown in FIGS. 14, 15, 22, and 23 are two bridge arm capacitors $C_{i11}$ and $C_{i12}$, $C_{i21}$ and $C_{i22}$ ..., $C_{in1}$ and $C_{in2}$). Due to space The energy management control strategy is critical to multiple new energy combined power systems. Since there are multiple input sources and corresponding power switching units, it is necessary to control multiple duty ratios. That is, there are multiple control degrees of freedom, which makes the energy management for various new energy sources possible. The energy management control strategy of the multi-winding single-stage multi-input boost type high-frequency link's inverter with simultaneous/time-sharing power supplies have three functions and are the energy management of input sources, the Maximum Power Point Tracking (MPPT) of the new energy power generation device such as photovoltaic cell and wind power generator, and the output voltage (current) control. Sometimes it is required for the charge and discharge control of the accumulator and the smooth and seamless switching of the system to be under different power supply modes. The multi-winding single-stage multi-input boost type high-frequency link's inverter with simultaneous/time-sharing power supplies has two different energy management modes: (1) Energy management mode I, the master-slave power distribution mode, wherein the power needed by the load is provided by the first, second, . . . , $(n-1)^{th}$ input sources of the main power supply equipment as much as possible. When the input current of the first, second . . . , $(n-1)^{th}$ input source is determined, the input power of the first, second . . . , $(n-1)^{th}$ input source is determined accordingly. The shortfall of power needed by the load is provided by the $n^{th}$ input source of the power supply equipment, without adding the accumulator energy storage device. (2) Energy management mode II, the maximum power output mode, wherein the first, second, . . . , $n^{th}$ input sources output the maximum power to the load, and the accumulator energy storage device is eliminated, which meets the requirement for full utilization of energy of the grid-connected power generation system. Further, the output end is connected to an accumulator charge and discharge device in parallel to stabilize the output voltage (current) of the individual power supply system. When the n input voltage of the new energy is determined, the input power of the first, second, . . . , and $n^{th}$ input sources can be controlled by controlling the input currents of the first, second, . . . , n input sources.

The push-pull, push-pull forward, half-bridge multi-winding unidirectional and bidirectional single-stage multi-input boost type high-frequency link's inverter with simultaneous/time-sharing power supplies shown in FIGS. 10-15 and FIGS. 18-23 can only work in the power supply mode of the same duty ratio, while the full-bridge multi-winding unidirectional and bidirectional single-stage multi-input boost type high-frequency link's inverter with simultaneous/time-sharing power supplies shown in FIGS. 16, 17, 24, and 25 can work in the power supply mode of the same duty ratio or in power supply mode of different duty ratios.

Figure 26:
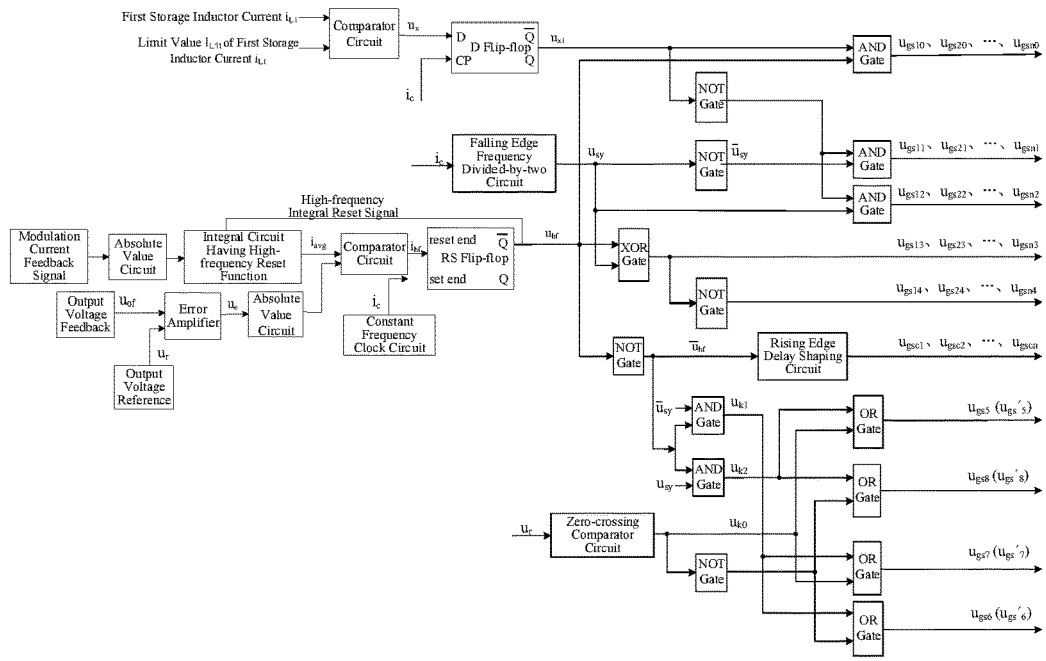
FIG. 26 is a block diagram showing the output voltage instantaneous value feedback single-cycle phase-shift control of multi-winding unidirectional single-stage multi-input boost type high-frequency link's inverter with simultaneous/time-sharing power supplies in the course of supplying power in the manner of the same duty ratio.
Figure 28:
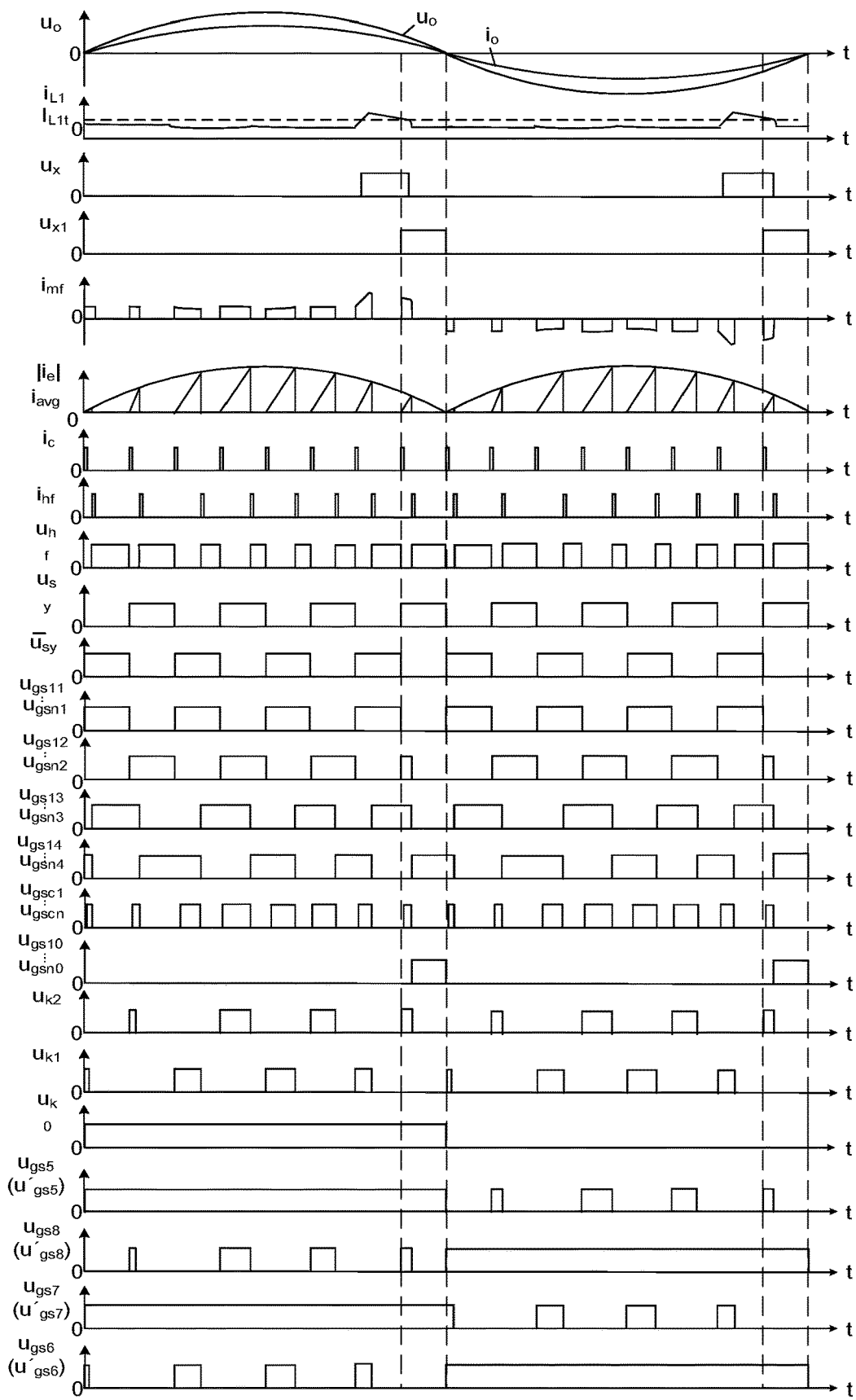
FIG. 28 is a waveform schematic diagram showing the output voltage instantaneous value feedback single-cycle phase-shift control of the multi-winding unidirectional single-stage multi-input boost type high-frequency link's inverter with simultaneous/time-sharing power supplies in the course of supplying power in the manner of the same duty ratio.

Taking the multi-winding unidirectional single-stage multi-input boost type high-frequency link's inverter with simultaneous/time-sharing power supplies with the energy storage inductor bypass switch working in the power supply mode of the same duty ratio as an example, the instantaneous value feedback single-cycle phase-shift control strategy of the n output voltages in the same duty ratio is employed, as is shown in FIGS. 26 and 28. In the inverter, the modulation current $i_{mf}$ between the cycloconverter and the output filter capacitor is detected and fed back to properly and timely adjust the duty ratio of the inverter, further to improve the quality of the output waveform. The output voltage feedback signal $u_{of}$ and the reference voltage signal $u_r$ pass through the voltage error amplifier to obtain the $u_e$, and the modulation current feedback signal $i_{mf}$ passes through the absolute value circuit and the integral circuit having the high-frequency reset function to obtain the current average signal $i_{avg}$. The $i_{avg}$ and $|u_e|$ are compared to obtain the high-frequency pulse width modulation (PWM) signal $u_{hf}$. The Uhf and the constant frequency clock signal $i_c$ respectively function as the reset end and the set end of the Reset-Set (RS) flip-flop. The output end $\overline{Q}$ of the RS flip-flop serves as the high-frequency integral reset signal of the integral circuit (i.e., the control signal of the reset switch). The constant frequency clock signal $i_c$ passes through the falling edge frequency divided-by-two circuit to obtain signal $u_{sy}$. The $u_r$ passes through the zero-crossing comparator circuit to get the polarity strobe signal $u_{kO}$. The $u_{hf}$, $u_{sy}$ and $u_{kO}$ pass through the combinational logic circuit to control the power switches $S_{11}$, $S_{21}$, . . . , $S_{n1}$, $S_{12}$, $S_{22}$, . . . , $S_{n2}$, $S_{13}$, $S_{23}$, . . . , $S_{n3}$, $S_{14}$, $S_{24}$, . . . , $S_{n4}$, $S_{c1}$, $S_{c2}$, $S_{cn}$, $S_5(S'_5)$, $S_6(S'_6)$, $S_7(S'_7)$, $S_8(S'_8)$. When the first storage inductor current $i_{L1}$ increases to the current limit value, the energy storage switch signal is aborted, and the bypass switches $S_{10}$, $S_{20}$, . . . , $S_{n1}$ are turned on to provide a freewheeling circuit for the energy storage inductor.

Figure 27:
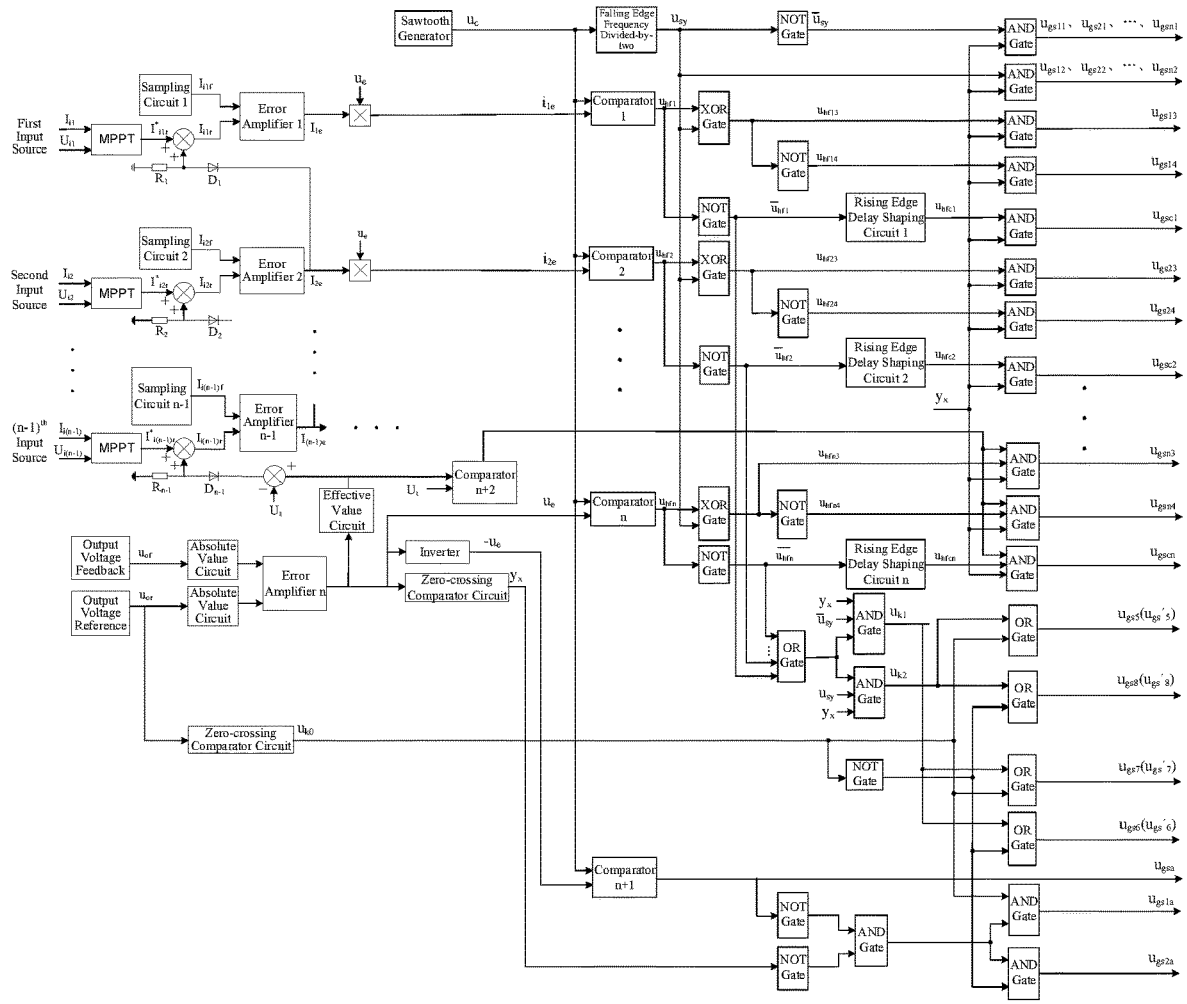
FIG. 27 is a block diagram showing the output voltage and input current instantaneous value feedback phase-shift master-slave power distribution energy management control of the multi-winding bidirectional single-stage multi-input boost type high-frequency link's inverter with simultaneous/time-sharing power supplies in the course of supplying power in the manner of different duty ratios.
Figure 29:
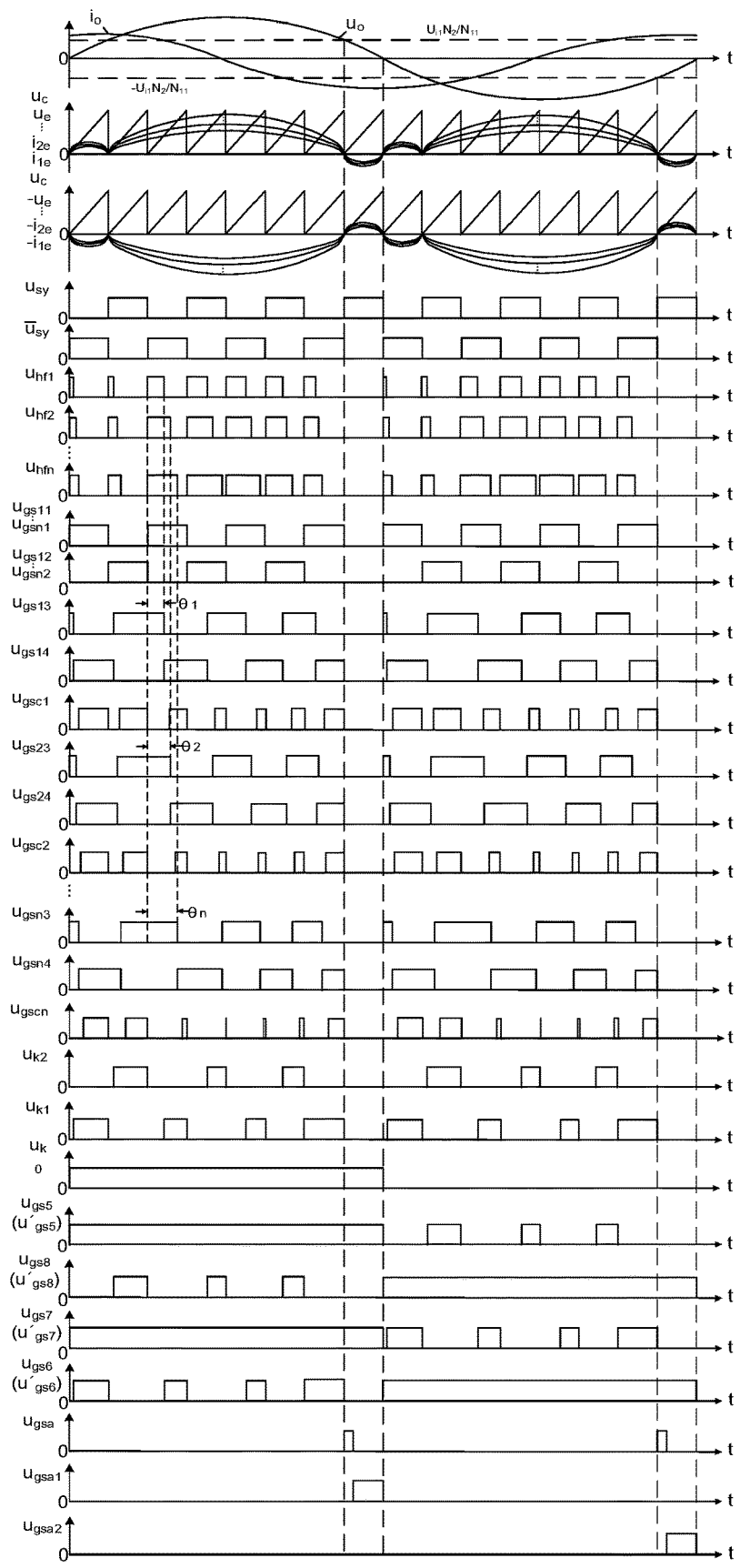
FIG. 29 is a waveform schematic diagram showing the output voltage and input current instantaneous value feedback phase-shift master-slave power distribution energy management control of multi-winding bidirectional single-stage multi-input boost type high-frequency link's inverter with simultaneous/time-sharing power supplies in the course of supplying power in the manner of different duty ratios.

Taking the multi-winding bidirectional single-stage multi-input boost type high-frequency link's inverter with simultaneous/time-sharing power supplies with adding the flyback high-frequency link's energy feedback circuit working in the power supply mode of different duty ratios as an example, the energy management control strategy of output voltage and input current instantaneous value feedback phase-shift master-slave power distribution is employed as shown in FIGS. 27 and 29, wherein the first, second, . . . , $(n-1)^{th}$ output power is fixed and the $n^{th}$ out power is used to make up the shortfall of the power needed by the load. The first, second, . . . , $(n-1)^{th}$ input source is calculated by the maximum power point to obtain the reference current signal $I^*_{i1r}$, $I^*_{i2r}$, . . . , $I^*_{i(n-1)r}$. The first, second, . . . , $(n-1)^{th}$ input current feedback signal $I_{i1f}$, $I_{i2f}$, . . . , $I_{i(n-1)f}$ of the inverter and the first, second . . . , $(n-1)^{th}$ reference current signal are respectively compared and amplified by a proportional-integral regulator. The amplified error signal $I_{1e}$, $I_{2e}$, . . . , $i_{(n-1)e}$ is respectively multiplied by the synchronization signal $u_e$ to obtain the $i_{1e}$, $i_{2e}$, . . . , $i_{(n-1)e}$. The output voltage feedback signal $u_{of}$ of the inverter and the reference sinusoidal voltage $u_r$ pass through the absolute value circuit and the proportional-integral regulator to obtain the $u_e$. The $i_{1e}$, $i_{2e}$, . . . , $i_{(n-1)e}$, and $u_e$ respectively cross with the zigzag carrier wave $u_c$ and the output voltage strobe signal $u_{kO}$ passes through the combinational logic circuit to obtain the control signal of the power switch $S_{11}$, $S_{21}$, . . . , $S_{n1}$, $S_{12}$, $S_{22}$, . . . , $S_{n2}$, $S_{13}$, $S_{23}$, . . . , $S_{n3}$, $S_{14}$, $S_{24}$, . . . , $S_{n4}$, $S_{c1}$, $S_{c2}$, $S_{cn}$, $S_5(S'_5)$, $S_6(S'_6)$, $S_7(S'_7)$, $S_8(S'_8)$. It should be noted that, when the output sinusoidal voltage drops and $|u_O| \leq |\leq U_{in} N_2 / N_{n1}$, the error voltage $u_e$ is less than zero, and the zero-crossing comparator outputs a low-level signal, the control signal of the main power channel power switch is blocked and the control signals of the flyback high-frequency link's energy feedback circuit power switch $S_{a1}$, $S_{a2}$, $S'_{a2}$ are started up. When the load power $P_o$ is greater than the sum of the maximum powers of the first, second, . . . , $(n-1)^{th}$ input sources, the output voltage $u_o$ decrease. When the effective value of the output voltage $u_e$ of the voltage regulator is greater than the comparison threshold level $U_r$, and the $I_{1e}$, $I_{2e}$, . . . , $I_{(n-1)e}$ are all greater than zero, the diodes $D_1$, $D_2$, . . . , $D_{n-1}$ block the current. The first, second, . . . , $(n-1)^{th}$ current regulator and the $n^{th}$ voltage regulator operate individually, namely, $I_{i1r} = I^*_{i1r}$, $I_{i2r} = I^*_{i2r}$, $I_{i(n-1)r} = I^*_{i(n-1)r}$, wherein the first, second, . . . , $(n-1)^{th}$ current regulator are used to achieve maximum power output of the first, second, . . . , $(n-1)^{th}$ input sources, the $n^{th}$ voltage regulator is used to stabilize the inverter output voltage, and the n input sources supply power to the load in a time-sharing manner. When the load power $P_o$ is less than the sum of the maximum powers of the first, second, . . . , $(n-1)^{th}$ input sources, the output voltage $u_o$ increase. When the effective value of the output voltage $u_e$ of the voltage regulator drops below the comparison threshold level $U_r$, the diode $D_{n-1}$ conducts the current, the diodes $D_1, D_2, \ldots, D_{n-2}$ still block the current. The hysteresis comparator circuit n+1 output the low level. The $n^{th}$ input source stops supplying power. The voltage regulator and current regulator form a dual closed-loop control system. The first, second, . . . , $(n-1)^{th}$ input sources supply power to the load in a switching cycle in a time-sharing manner. The reference current $I_{i(n-1)r}$ of the current regulator decreases, namely, $I_{i(n-1)r} < I^*_{i(n-1)r}$. The n-1 input source output power decreases (working at the non-maximum operating point). The output power of the nth input source decreases to zero. The output voltage $u_o$ of the inverter tends to be stable. When the input voltage or load vary, the reference voltage $u_r$ or the feedback voltage $u_{of}$ is adjusted to change the error voltage signal $u_e$ and the error current signals $i_{1e}, i_{2e}, \ldots, i_{(n-1)e}$, thereby changing the phase-shift angles $\theta_1, \theta, \ldots \theta_n$. Consequently, the output voltage and input current (output power) of the inverter can be adjusted and stabilized.

Figure 30:
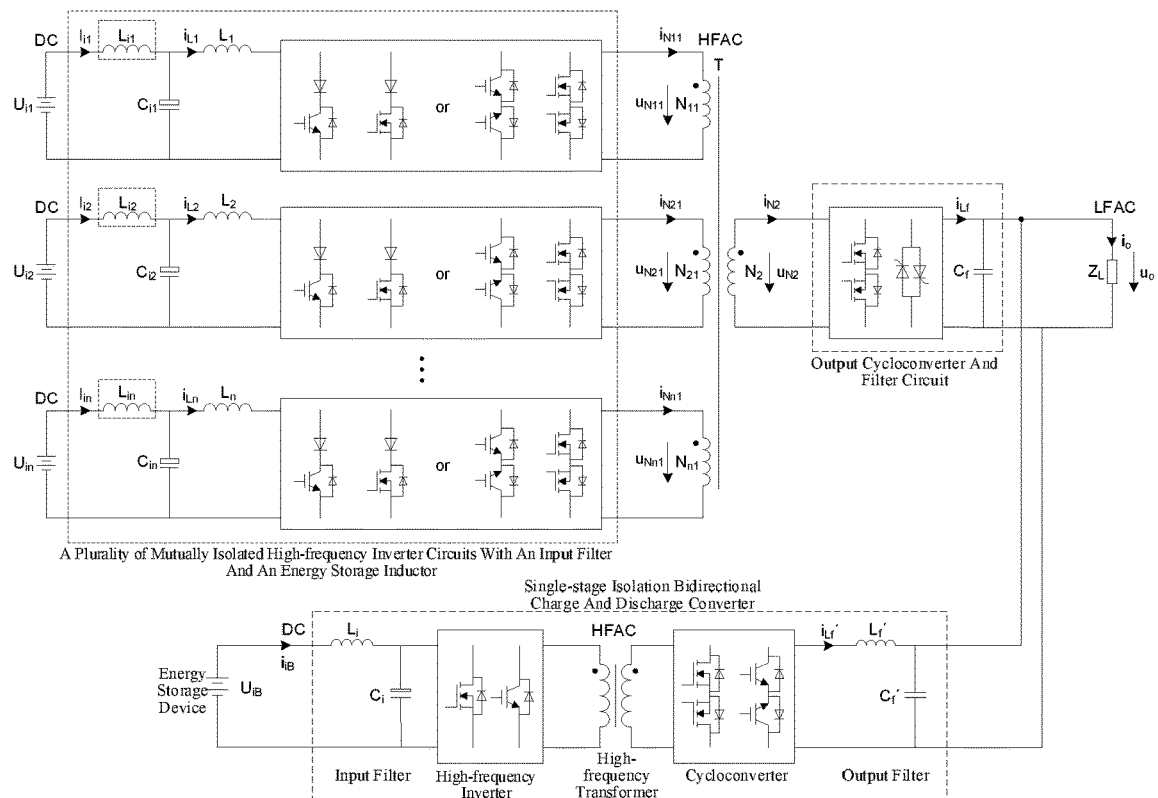
FIG. 30 shows a multi-winding single-stage multi-input boost type high-frequency link's individual power supply system with simultaneous/time-sharing power supplies having a single-stage isolation bidirectional charge and discharge converter connected to the output end in parallel.

In order to form an individual power supply system that can fully utilize the energy from multiple input sources, multiple input sources should operate in the maximum power output mode and need to be configured with the energy storage device to stabilize the output voltage. That is, the output end of the inverter is connected to the single-stage isolation bidirectional charge and discharge converter in parallel, as shown in FIG. 30. The single-stage isolation bidirectional charge and discharge converter is composed of the input filter ($L_i$, $C_i$ or $C_i$), the high-frequency inverter, the high-frequency transformer, the cycloconverter and the output filter ($L_f'$, $C_f'$), which are successively connected in cascade. The cycloconverter is composed of the four-quadrant high-frequency power switches capable of withstanding bidirectional voltage stress and bidirectional current stress. The single-stage isolation bidirectional charge-discharge converter is equivalent to a single-stage high-frequency link's DC-AC converter when energy is transferred forward (the energy storage device discharges), while the single-stage isolation bidirectional charge-discharge converter is equivalent to a single-stage high-frequency link's AC-DC converter when energy is transferred in reverse (the energy storage device charges).

Figure 31:
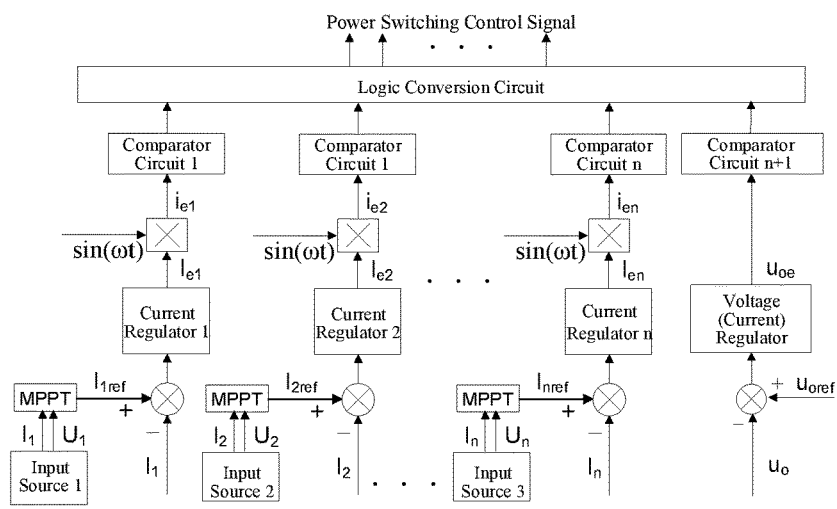
FIG. 31 shows an energy management control strategy of the maximum power output of the output voltage individual control loop with the single-stage isolation bidirectional charge and discharge converter.
Figure 32:
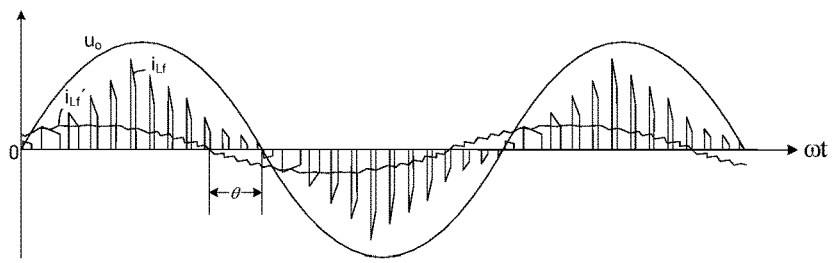
FIG. 32 shows waveforms of the output voltage $u_o$, the output current $i_{Lf}$ and the output filter inductor current $i_{Lf}$ of the individual power supply system.

The individual power supply system employs the maximum power output energy management control strategy with the single-stage isolation bidirectional charge and discharge converter output voltage individual control loop, as shown in FIG. 31. When the load power ($P_o = U_o I_o$) is greater than the sum of maximum powers of the plurality of input sources ($P_{1max} + P_{2max} + \ldots + P_{nmax}$), the energy storage devices such as accumulators and supercapacitors provide the shortfall of power needed by the load through the single-stage isolation bidirectional charge and discharge converter, i.e. the power supply mode II, the energy storage device individually supplies power to the load, i.e. the power supply mode III, which is the extreme situation of the power supply mode II. When the load power ($P_o = U_o I_o$) is less than the sum of maximum powers of the plurality of input sources ($P_{1max} + P_{2max} + \ldots + P_{nmax}$), the rest of the energy from multiple input sources output charges the energy storage device through the single-stage isolation bidirectional charge and discharge converter, i.e. the power supply mode I. Taking the resistive load as an example, the power flow direction control of the single-stage isolation bidirectional charge and discharge converter is described herein, and shown in FIG. 32. In view of the output filter capacitors $C_f$, $C_f'$ and the load $Z_L$, the parallel connection of the output ends of the multi-winding simultaneous/time-sharing current supply type single-stage multi-input high-frequency link's inverter and the single-stage isolation bidirectional charge and discharge converter, is equivalent to the parallel-connected superposition of two current sources. According to the energy management control strategy shown in FIG. 31, the fundamental component of the output current hi of the multi-winding single-stage multi-input boost type high-frequency link's inverter with simultaneous/time-sharing power supplies has the same phase and frequency as the output voltage $u_o$, to output the active power. The charge and discharge converter is controlled by the sinusoidal pulse width modulation (SPWM) signal generated by crossing the error amplification signal $u_{oe}$ of the output voltage $u_o$ and the reference voltage $u_{oref}$ and the high frequency carrier. There is a phase difference $\theta$ between the output filter inductor current $i_{Lf}$ and the $u_o$, and the different phase differences $\theta$ are indicative of outputting the active power having different magnitudes and directions. When $P_o = P_{1max} + P_{2max} + \ldots + P_{nmax}$, $\theta = 90°$, the active power output by the charge and discharge converter is zero, the charge and discharge converter is in a no-load state. When $P_o > P_{1max} + P_{2max} + \ldots + P_{nmax}$, $u_o$ decreases, $\theta < 90°$, the charge and discharge converter outputs the active power, the energy storage device discharges to the load, i.e. the energy storage device provides the shortfall of power needed by the load. When $P_o < P_{1max} + P_{2max} + \ldots + P_{nmax}$, $u_o$ increases, $\theta > 90°$, the charge and discharge converter outputs minus active power, the load feeds back energy to the energy storage device. That is, the rest of the energy from the plurality of input sources charges the energy storage device. When $\theta = 180°$, the energy feedback from the load to the energy storage device is maximum. Therefore, the energy management control strategy can control the magnitude and direction of the power flow of the single-stage isolation bidirectional charge and discharge converter in real time based on the magnitude comparison of $P_o$ and $P_{1max} + P_{2max} + \ldots + P_{nmax}$, thereby achieving the smooth and seamless switching of the system under three different power supply modes.

What is claimed is:

1. A multi-winding single-stage multi-input boost type high-frequency link's inverter with simultaneous/time-sharing power supplies, wherein, the inverter is formed by connecting a plurality of mutually isolated high-frequency inverter circuits having an input filter and an energy storage inductor, a common output cycloconverter and filter circuit by a multi-input single-output high-frequency transformer; each input end of the multi-input single-output high-frequency transformer is connected in one-to-one correspondence to an output end of each high-frequency inverter circuit; an output end of the multi-input single-output high-frequency transformer is connected to an input end of the output cycloconverter and filter circuit; each high-frequency inverter circuit with the input filter and the energy storage inductor comprises the input filter, the energy storage inductor, and a single-input single-output high-frequency inverter circuit; the input filter, the energy storage inductor and the single-input single-output high-frequency inverter circuit are successively connected in cascade; the output cycloconverter and filter circuit comprises a full-wave or bridge cycloconverter, and an output filter; the full-wave or bridge cycloconverter and the output filter are successively connected in cascade; each single-input single-output high-frequency inverter circuit comprises 2 or 4 two-quadrant high-frequency power switches capable of withstanding bidirectional voltage stress and unidirectional current stress, or comprises 2 or 4 four-quadrant high-frequency power switches capable of withstanding the bidirectional voltage stress and bidirectional current stress; the full-wave or bridge cycloconverter comprises 2 or 4 four-quadrant high-frequency power switches capable of withstanding the bidirectional voltage stress and the bidirectional current stress; the plurality of mutually isolated high-frequency inverter circuits invert pulsating direct currents with a amplitude thereof of a sine half-wave envelope in a plurality of high-frequency energy storage inductors $L_1, L_2, \ldots, L_n$ into bipolar three-state high-frequency pulse currents, and after electrical isolation, transmission and current matching of the high-frequency transformer, the bipolar three-state multilevel high-frequency pulse currents pass through a cycloconverter, a output C filter capacitor and a output C-L filter capacitor to obtain a high-quality sinusoidal alternating voltage or sinusoidal alternating current on a single-phase alternating current passive load or a single-phase alternating current grid, wherein n is a number of a plurality of input sources and is a natural number greater than 1; circuit topologies of the multi-winding single-stage multi-input boost type high-frequency link's inverter with simultaneous/time-sharing power supplies comprise a push-pull full-wave unidirectional circuit, a push-pull full-bridge unidirectional circuit, a push-pull forward full-wave unidirectional circuit, a push-pull forward full-bridge unidirectional circuit, a half-bridge full-wave unidirectional circuit, a half-bridge full-bridge unidirectional circuit, a full-bridge full-wave unidirectional circuit, a full-bridge full-bridge unidirectional circuit, a push-pull full-wave bidirectional circuit, a push-pull full-bridge bidirectional circuit, a push-pull forward full-wave bidirectional circuit, a push-pull forward full-bridge bidirectional circuit, a half-bridge full-wave bidirectional circuit, a half-bridge full-bridge bidirectional circuit, a full-bridge full-wave bidirectional circuit and a full-bridge full-bridge bidirectional circuit the push-pull full-wave unidirectional circuit, the push-pull full-bridge unidirectional circuit, the push-pull forward full-wave unidirectional circuit, the push-pull forward full-bridge unidirectional circuit, the half-bridge full-wave unidirectional circuit and the half-bridge full-bridge unidirectional circuit are formed by 2n two-quadrant high-frequency power switches capable of withstanding the bidirectional voltage stress and the unidirectional current stress, and 2 or 4 four-quadrant high-frequency power switches, respectively; the full-bridge full-wave unidirectional circuit and the full-bridge full-bridge unidirectional circuit are formed by 4n two-quadrant high-frequency power switches capable of withstanding the bidirectional voltage stress and the unidirectional current stress, and 2 or 4 four-quadrant high-frequency power switches, respectively; the push-pull full-wave bidirectional circuit, the push-pull full-bridge bidirectional circuit, the push-pull forward full-wave bidirectional circuit, the push-pull forward full-bridge bidirectional circuit, the half-bridge full-wave bidirectional circuit and the half-bridge full-bridge bidirectional circuit are formed by 2(n+1) or 2(n+2) four-quadrant high-frequency power switches capable of withstanding the bidirectional voltage stress and the bidirectional current stress, respectively; the full-bridge full-wave bidirectional circuit and the full-bridge full-bridge bidirectional circuit are formed by 4(n+1/2) or 4(n+1) four-quadrant high-frequency power switches capable of withstanding bidirectional voltage stress and bidirectional current stress, respectively; the circuit topologies of the multi-winding single-stage multi-input boost type high-frequency link's inverter with simultaneous/time-sharing power supplies all include n two-quadrant high-frequency clamp switches capable of withstanding the unidirectional voltage stress and the bidirectional current stress; a push-pull inverter, a push-pull forward inverter and a half-bridge inverter working in a power supply mode of a same duty ratio employ a instantaneous value feedback single-cycle phase-shift control strategy of n output voltages in the same duty ratio; a full-bridge inverter working in the power supply mode of the same duty ratio or in a power supply mode of different duty ratios employs a energy management control strategy of output voltage and input current instantaneous value feedback phase-shift master-slave power distribution, wherein first, second, . . . , $(n-1)^{th}$ output power is fixed and the $n^{th}$ out power is used to make up shortfall of a power needed by a load; the multi-winding single-stage multi-input boost type high-frequency link's inverter with simultaneous/time-sharing power supplies invert a plurality of unstable input direct voltages connected to a non-common ground into a stable high-quality output AC power required by the load; the plurality of input sources supply power to an output AC load in a high-frequency switching cycle, and the plurality of input sources supply power to the output AC load in a simultaneous/time-sharing manner in a high-frequency switching cycle.

2. The multi-winding single-stage multi-input boost type high-frequency link's inverter with simultaneous/time-sharing power supplies of claim 1, wherein, an output end of the multi-winding single-stage multi-input boost type high-frequency link's inverter with simultaneous/time-sharing power supplies is connected to a single-stage isolation bidirectional charge and discharge converter of an energy storage device in parallel to form an individual power supply system capable of fully utilizing the energy from multiple input sources with stable output voltage; the single-stage isolation bidirectional charge and discharge converter comprises the input filter, the high-frequency inverter, the high-frequency transformer, the cycloconverter and the output filter; the input filter, the high-frequency inverter, the high-frequency transformer, the cycloconverter, output filter are successively connected in cascade; the cycloconverter comprises four-quadrant high-frequency power switches capable of withstanding the bidirectional voltage stress and the bidirectional current stress; the individual power supply system employs a maximum power output energy management control strategy with a single-stage isolation bidirectional charge and discharge converter output voltage individual control loop; the plurality of input sources operate in the maximum power output mode, and a magnitude and a direction of a power flow of the single-stage isolation bidirectional charge and discharge converter is controllable in real time based on a magnitude comparison of a load power and a sum of maximum powers of the plurality of input sources to achieve stability of a system output voltage and smooth and seamless switching of charging and discharging of the energy storage device; when the load power is greater than the sum of maximum powers of the plurality of input sources, the individual power supply system works in power supply mode II, wherein, in the power supply mode II, the energy storage device such as accumulator and supercapacitor provides the shortfall of power needed by the load through the single-stage isolation bidirectional charge and discharge converter; power supply mode III is an extreme situation of the power supply mode II, and in the power supply mode III, the energy storage device individually supplies power to the load; when the load power is less than the sum of maximum powers of the plurality of input sources, the individual power supply system works in power supply mode I, wherein, in the power supply mode I, rest of the energy from the plurality of input sources charges the energy storage device through the single-stage isolation bidirectional charge and discharge converter; an output filter inductor current of the multi-winding single-stage multi-input boost type high-frequency link's inverter with simultaneous/time-sharing power supplies has a same phase and frequency as a output voltage to output the active power; the single-stage isolation bidirectional charge and discharge converter is controlled by a SPWM signal generated by crossing an error amplification signal of the output voltage and a reference voltage and the high frequency carrier to generate a phase difference $\theta$ between the output filter inductor current and the output voltage, and the different phase differences $\theta$ are indicative of outputting the active power having different magnitudes and directions; when the load power is equal to the sum of maximum powers of the plurality of input sources, the active power output by the single-stage isolation bidirectional charge and discharge converter is zero; when the load power is greater than the sum of maximum powers of the plurality of input sources, the output voltage decreases, $\theta<90°$, the single-stage isolation bidirectional charge and discharge converter outputs the active power, the energy storage device discharges to the load, i.e. the energy storage device provides the shortfall of power needed by the load; when the load power is less than the sum of maximum powers of the plurality of input sources, the output voltage increases, $\theta>90°$, the single-stage isolation bidirectional charge and discharge converter outputs minus active power, i.e. the rest of the energy from the plurality of input sources charges the energy storage device.

* * * * *